US006671244B2

(12) United States Patent
Honma

(10) Patent No.: US 6,671,244 B2
(45) Date of Patent: Dec. 30, 2003

(54) INFORMATION DETECTING CIRCUIT INCLUDING ADAPTIVE EQUALIZER AND REPRODUCING APPARATUS

(75) Inventor: Hiromi Honma, Tokyo (JP)

(73) Assignee: NEC Corporation, Tokyo (JP)

( * ) Notice: Subject to any disclaimer, the term of this patent is extended or adjusted under 35 U.S.C. 154(b) by 467 days.

(21) Appl. No.: 09/746,879

(22) Filed: Dec. 22, 2000

(65) Prior Publication Data

US 2001/0005175 A1 Jun. 28, 2001

(30) Foreign Application Priority Data

Dec. 24, 1999 (JP) .......................................... 11-367483

(51) Int. Cl.[7] .............................................. G11B 5/09
(52) U.S. Cl. .............................. 369/59.22; 369/124.07; 369/47.18
(58) Field of Search ...................... 369/124.05, 124.07, 369/124.1, 124.11, 124.14, 59.17, 59.19, 59.2, 59.21, 59.22, 47.18, 47.28

(56) References Cited

U.S. PATENT DOCUMENTS

| | | | | |
|---|---|---|---|---|
| 5,623,474 A | * | 4/1997 | Oshio et al. ............. | 369/47.19 |
| 5,677,802 A | * | 10/1997 | Saiki et al. .............. | 369/59.22 |
| 5,729,517 A | * | 3/1998 | Fujiwara et al. ......... | 369/59.22 |
| 5,764,611 A | * | 6/1998 | Watanabe ................ | 369/53.19 |
| 5,870,372 A | * | 2/1999 | Kuribayashi ............. | 369/53.19 |
| 6,028,728 A | * | 2/2000 | Reed ........................ | 360/51 |
| 6,084,924 A | * | 7/2000 | Melas ...................... | 360/65 |
| 6,201,832 B1 | * | 3/2001 | Choi ........................ | 360/65 |
| 6,304,538 B1 | * | 10/2001 | Hayashi ................... | 369/59.22 |
| 6,307,900 B1 | * | 10/2001 | Choi ........................ | 375/341 |
| 6,381,085 B1 | * | 4/2002 | Du et al. .................. | 360/65 |

FOREIGN PATENT DOCUMENTS

| | | |
|---|---|---|
| JP | 8-321140 | 12/1996 |
| JP | 9-204740 | 8/1997 |
| JP | 10-27435 | 1/1998 |

OTHER PUBLICATIONS

Hirose Inose and Hiroshi Miyagawa, titled "Improvement of PCM Communication" pp. 148–184.

IEEE Transaction on Communications Technology, vol. COM–19, No. 5, Oct. 1971, pp. 751–772.

IT '94: 1994 ITE Annual Convention, pp. 287–288, titled "A PRML System on the Optical Video Disk Recorder" by S. Itoi, et al.

* cited by examiner

Primary Examiner—Thang V. Tran
(74) Attorney, Agent, or Firm—Dickstein, Shapiro, Morin & Oshinsky LLP

(57) ABSTRACT

In an information detecting circuit, an equalizer equalizes an output from an A/D converter as an A/D converting information. A first interpolation circuit generates an interpolating value. A delay circuit delays the A/D converting information with a delay quantity equivalent to an output delay quantity of the equalizer. A second interpolation circuit generates an interpolating value. An interpolating position generating circuit produces an interpolating position information for generating an interpolating value synchronized in phase with the channel clock and supplies the interpolating position information into the first interpolation circuit and the second interpolation circuit. A binary encoder converts the output of the first interpolation circuit. A tap coefficient controller generates a tap coefficient from interpolating value outputs of the first and second interpolations. A rate correcting circuit converts the tap coefficient to be fed-back to the equalizer.

30 Claims, 19 Drawing Sheets

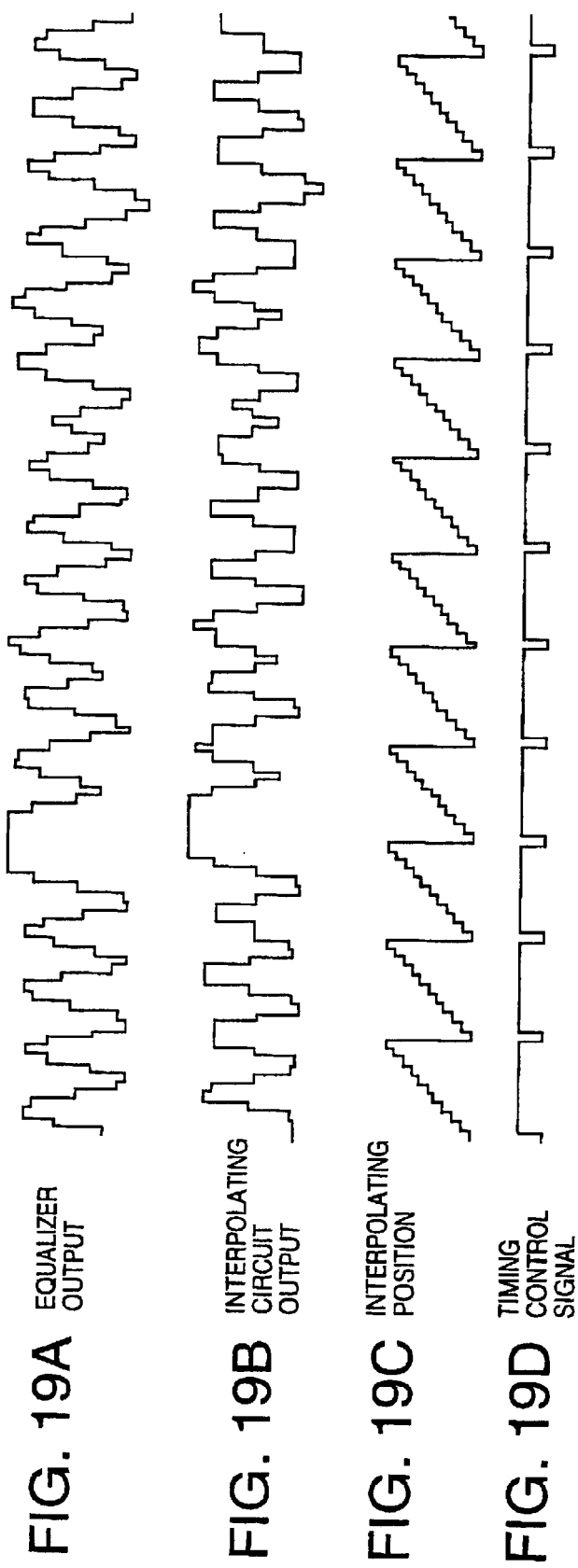

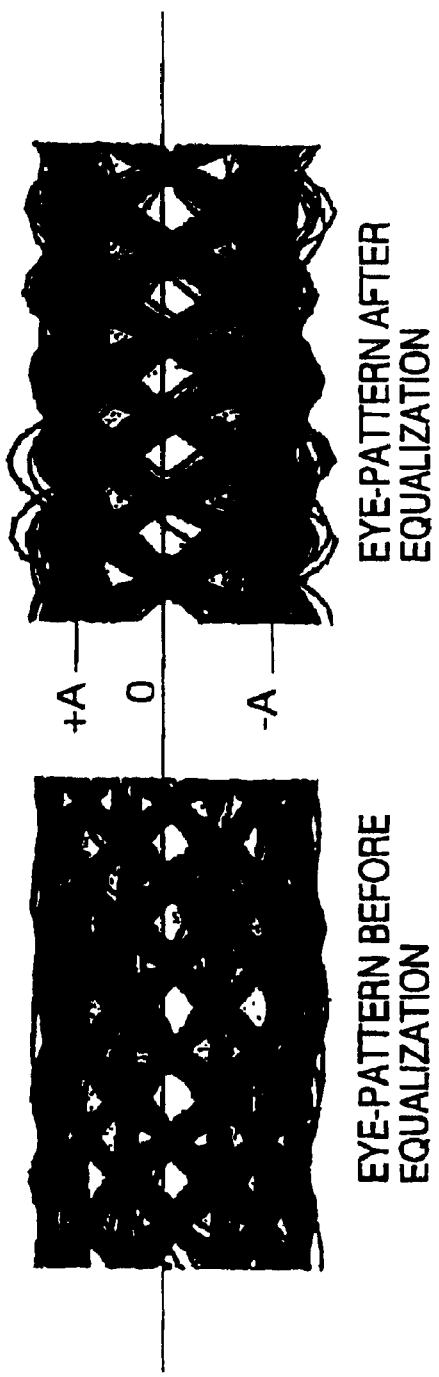
FIG. 21A EYE-PATTERN BEFORE EQUALIZATION
FIG. 21B EYE-PATTERN AFTER EQUALIZATION

INFORMATION DETECTING CIRCUIT INCLUDING ADAPTIVE EQUALIZER AND REPRODUCING APPARATUS

BACKGROUND OF THE INVENTION

This invention relates to an apparatus for reproducing information which have been recorded with high density and, in particular, to an apparatus for improving a follow-up performance and an information detecting performance.

Recently, it is required to process a large quantity of information with the rapid development in multi-media. Following this, requirements are also being made for a storage device having a large capacity for recording the information.

In order to meet this requirement, a recording density should be enhanced to increase a recording capacity of an optical disk devise or a HDD device as well as to reduce an error rate and to ensure the reliability.

Meanwhile, a reproducing system called "PRML (Partial Response Maximum Likelihood)" is popularly utilized for a file device because this system ensures a high reproducing performance for a high-density recording/reproducing waveform having a low resolution.

Herein, it is to be noted that the PRML system is structured by combining a partial response waveform equalization with a maximum likelihood detection.

It is well known to detect the maximum likelihood after correcting the reproducing waveform by equalizing the waveform in order to maximize a characteristic to a maximum likelihood detector considering a reproducing channel into account.

The PRML system is disclosed in, for example, a preprints of ITE '94:1994 ITE Annual Convention, pages 287–288, titled "A PRML System on the Optical Video Disk Recorder" by S. Itoi, et al.

When the information recorded with the high density is reproduced in the optical disk and the magnetic disk, inter-symbol interference becomes large and the reproducing amplitude will be lowered.

Followingly, SNR (signal to noise ratio) becomes small in the magnetic disk while CNR (carrier to noise ratio) of a high frequency component of a readout signal becomes small in the optical disk. As a result, an error rate of a detected information will inevitably be increased.

In the maximum likelihood system, the information is detected by utilizing the characteristic of the reproducing channel having the predetermined state transfer.

The information is selected so as to minimize a root mean square of an error among all time series patterns considered from the characteristic of the reproducing channel for amplitude information series having the quantum bit number of about 8 bits inputted to the detector.

Thereby the information can be detected with a lower error rate even when the SNR or CNR is small.

It is difficult to perform the above-mentioned process with an actual circuit from the viewpoints concerning a circuit scale and an operation speed. Normally the above-mentioned process is realized by gradually selecting paths using algorithms called "Viterbi algorithms". Herein, the Viterbi-algorithms are disclosed in a paper, for example, IEEE Transaction on Communications Technology, VOL. COM-19, No. 5, October 1971, pages 751–772.

In this case, the Viterbi detector and a digital circuit group connected afterward are synchronous circuits and therefore require a synchronous clock signal.

Generally, the clock signal is produced from the readout signal itself. However, the readout signal of the disk device slightly changes in accordance with the rotation jitter of a spindle or disk tilts A clock extracting circuit called PLL (Phase Locked Loop) is required in order to deal with the above-mentioned change.

In the case where the Viterbi detector is used, a stationary phase error is generated in the structure of the conventional analog PLL circuit and the PRML detector, and the error rate raises. In this viewpoint, a phase synchronous loop is generally structured by carrying out a phase comparison using a sample data (namely, a digital data) after an analog-digital conversion (A/D conversion).

For example, the above-mentioned PLL circuit is disclosed in Japanese Unexamined patent Publication (JP-A) No. Hei. 8-321140 or Japanese Unexamined patent Publication (JP-A) No. Hei. 9-204740.

In the PLL circuit disclosed in the above Japanese Unexamined Patent Publication (JP-A) No. Hei. 8-321140, an output of a loop filter (LPF; low path filter) is converted into an analog signal by the use of a D/A converter (DAC), and is supplied to a voltage control oscillator (VCO) of an analog system in order to generate a PLL clock.

In this event, it is difficult to structure the PLL circuit having the same grade of the performance because the analog VCO circuit has a large characteristic difference.

In contrast, disclosure has been made about a reproducing method in which an A/D conversion is carried out by the use of a system clock that is not synchronized with a channel clock of a readout signal, and a sample series having a desired phase is re-generated by an interpolation circuit.

By using the above-mentioned method, an entire reproducing system including the PLL circuit can be digitized.

Further, suggestion has been made about an automatic equalizing method or an adaptive equalizing method as techniques for enhancing a detecting performance by adaptively correcting deterioration of the signal with time.

For example, disclosure has been made about an continuous-type of adaptive equalizing algorithms in a paper by Hirosi Inose and Hiroshi Miyagawa, titled "Improvement of PCM communication" pp. 148–184, and in particular, "Zero Forcing method", "Mean Square method" and "Modified Zero Forcing method" are generally used. Such an adaptive equalizing technique has an advantageous effect because an initial adjustment of the device is not necessary.

The conventional type of a circuit for realizing the adaptive equalization includes a plurality of multipliers and integrators which as a result leads to a serious problem from the viewpoint of a circuit scale.

However, this problem has been almost resolved with the recent development of the semiconductor processing technique.

As mentioned above, the readout signal recorded with the high density is deteriorated in SNR by the affect of the inter-symbol interference. Consequently, more excellent follow-up performance can be obtained in PLL by correcting the frequency characteristic by the equalizer.

Two kinds of structures are known depending upon the arrangement of the equalizer, each of which has both the advantages and disadvantages.

A first structure is the most generally used structure, Namely, after the equalization is carried out by the use of the analog equalizer, the A/D conversion is performed to conduct the PLL operation. In first structure, it is difficult to automatically adjust the equalizing characteristic.

Therefore, the first structure can not cope with the characteristic change of the readout signal caused by the deterioration of the head, the mechanism, and the medium with time and the operating environment condition. A wide margin should preliminarily be assigned for the signal detecting system in advance.

In contrast, a second structure is illustrated in FIG. 1. Specifically, a digital equalizer 2 is inserted between an output of an A/D converter 1 given with a readout signal and a PLL circuit (including a phase comparator 41, LPF 42, DAC 44, and VCO 45) in the adaptive equalizer.

The adaptive equalizer is provided with a tap coefficient controller 6 which automatically correct the coefficient of the equalizer 2 by the use of the information before and after the equalization.

However, the numbers of taps should be increased to enhance the equalizing performance in the second structure. This increases the output delay.

Moreover, the pipeline of the circuit is required for the multipliers (not shown) in the equalizer 2 in order to perform the operation at a high speed. This also increases the output delay. As a result, the delay due to the equalizer 2 often exceeds ten stages.

In the meantime, the system adaptively follows for the inputted signal in the second structure. Therefore, the second structure is resistant to the deterioration with time and any operating environment.

However, the loop delay of PLL is increased and is damaged with respect to the follow-up characteristic in the second structure because the equalizer with the long output delay is additionally provided thereto.

SUMMARY OF THE INVENTION

It is therefore an object of this invention to provide a digital PLL circuit which follows a change with time with a short loop delay and a wide margin.

It is another object of this invention to provide an information detecting apparatus which includes a digital PLL circuit which follows a change with time with a short loop delay and a wide margin, and an equalizer which automatically follows a channel characteristic suitable for a Viterbi detection.

It is further another object of this invention to provide to an optical disk apparatus which has a digital PLL circuit which follows a change with time with a short loop delay and a wide margin and capable of enhancing reliability of the apparatus.

In an information detecting circuit according to this invention, an AID converter samples a reproducing signal with a frequency higher than a channel clock of the reproducing signal.

An equalizer equalizes an output from the A/D converter as an A/D converting information.

A first interpolation circuit generates an interpolating value from an output value series of the equalizer.

A delay circuit delays the A/D converting information with a delay quantity equivalent to an output delay quantity of the equalizer and produces the delayed information.

A second interpolation circuit generates an interpolating value from an output value series of the delay circuit.

An interpolating position generating circuit produces an interpolating position information for generating an interpolating value synchronized in phase with the channel clock of the readout signal from an output of the first interpolation circuit and supplies the interpolating position information into the first interpolation circuit and the second interpolation circuit.

A binary encoder converts the output of the first interpolation circuit into a binary code and produces a reproducing data series A tap coefficient controller generates a tap coefficient from an interpolating value output of the first interpolation circuit and an interpolating value output of the second interpolation circuit.

A rate correcting circuit converts the tap coefficient produced from the tap coefficient controller for the equalizer.

With such a structure, the tap coefficient converted for the equalizer by the rate correcting circuit is fed-back to the equalizer.

The tap coefficient produced from the tap coefficient controller may be directly supplied to the equalizer without passing the rate correcting circuit.

Each of the first and second interpolation circuits may produce the interpolating value based upon a signal of one sample clock or a plurality of sample clocks proceeding an inputted present signal value and the interpolating position information by linearly interpolating or interpolating with higher degree.

The interpolating position generating circuit may include a phase comparator which converts an input information into a phase information, a low pass filter which is given an output of the phase comparator, and a frequency converting circuit which generates the interpolating position information on the basis of a frequency information as output of the low pass filter.

The frequency converting circuit may include means for producing an interpolating position signal having a sawtooth waveform and having a slope corresponding to a deviation quantity of the frequency, and means for producing a timing control signal for halting an operation of the circuit in a portion where the interpolating position signal becomes discontinuous.

The rate correcting circuit may produce a tap coefficient obtained by correcting the tap coefficient value produced from the tap coefficient controller with one or more degree of a timing difference between the channel clock and the sampling clock.

The binary encoder may comprise a Viterbi detector.

In an information detecting circuit according to this invention, an A/D converter samples a reproducing signal with a frequency higher than a channel clock of the reproducing signal.

A first equalizer equalizes an output from the A/D converter as an A/D converting information.

A first interpolation circuit generates an interpolating value from an output value series of the first equalizer.

A delay circuit delays the A/D converting information with a delay quantity equivalent to an output delay quantity of the first equalizer and produces the delayed information.

A second interpolation circuit generates an interpolating value from an output value series of the delay circuit.

A second equalizer equalizes the A/D converting information.

A third interpolation circuit generates an interpolating value from an output value series of the second equalizer.

An interpolating position generating circuit produces an interpolating position information for generating an interpolating value synchronized in phase with the channel clock of the reproducing signal from an output of the first interpolation circuit and supplies the interpolating position information into the first interpolation circuit, the second interpolation circuit, and the third interpolation circuit.

A first tap coefficient controller generates a tap coefficient from an interpolating value output of the first interpolation circuit and an interpolating value output of the second interpolation circuit.

A first rate correcting circuit converts the tap coefficient produced from the first tap coefficient controller for the first equalizer.

A second tap coefficient controller generates a tap coefficient from an interpolating value output of the second interpolation circuit and an interpolating value output of the third interpolation circuit.

A second rate correcting circuit converts the tap coefficient produced from the second tap coefficient controller for the second equalizer.

A binary encoder converts the output of the third interpolation circuit into a binary code and produces a reproducing data series.

With this structure, the tap coefficient produced from the first rate correcting circuit is fed-back into the first equalizer, and the tap coefficient produced from the second rate correcting circuit is fed-back into the second equalizer.

In an information detecting circuit according to this invention, an A/D converter samples a readout signal with a frequency higher than a channel clock of the readout signal.

A first equalizer equalizes an output from the A/D converter as an A/D converting information.

A first interpolation circuit generates an interpolating value from an output value series of the first equalizer.

A delay circuit delays the A/D converting information with a delay quantity equivalent to an output delay quantity to the first equalizer and produces the delayed information.

A second interpolation circuit generates an interpolating value from an output value series of the delay circuit.

A second equalizer equalizes the A/D converting information.

A third interpolation circuit generates an interpolating value from an output value series of the second equalizer.

An interpolating position generating circuit produces an interpolating position information for generating an interpolating value synchronized in phase with the channel clock of the readout signal from an output of the first interpolation circuit and supplies the interpolating position information into the first interpolation circuit, the second interpolation circuit and the third interpolation circuit.

A selector selects an output of the first interpolation circuit and an output of the third interpolation circuit in accordance with an inputted equalizing selection signal.

A tap coefficient controller is variable in an equalizing system in accordance with the equalizing selection signal and is given with an output of the selector and an output of the second interpolation circuit to produce a tap coefficient.

A rate correcting circuit converts the tap coefficient produced from the tap coefficient controller for the first and second equalizers.

First and second registers select and control so as to produce or hold an output value from the rate correcting circuit in accordance with the equalizing selection signal.

A binary encoder converts the output of the third interpolation circuit into a binary code and produces a reproducing data series.

With such a structure, the tap coefficients produced from the first and second resistors are fed-back into the first and second equalizers, respectively.

In an information detecting circuit according to this invention, an A/D converter samples a readout signal with a predetermined sample rate.

An equalizer equalizes an output from the A/D converter as an A/D converting information.

A first interpolation circuit generates an interpolating value from an output value series of the equalizer.

A delay circuit delays the A/D converting information with a delay quantity equivalent to an output delay quantity of the equalizer and produces the delayed information.

A second interpolation circuit generates an interpolating value from an output value series of the delay circuit.

An interpolating position generating circuit produces an interpolating position information for generating an interpolating value synchronized in phase with the channel clock of the readout signal from an output of the first interpolation circuit and supplies the interpolating position information into the first interpolation circuit and the second interpolation circuit.

A binary encoder converts the output to the first interpolation circuit into a binary code and produces a reproducing data series.

A tap coefficient controller generates a tap coefficient from an interpolating value output of the first interpolation circuit and an interpolating value output of the second interpolation circuit.

With this structure, the tap coefficient produced from the tap coefficient controller is directly fed-back to the equalizer.

In a reproducing apparatus according to this invention, an A/D converter A/D-converts a readout signal with a sampling clock of a frequency higher than a channel clock and produces the converted signal.

An equalizer equalizes a digital output from the ND converter with the same sampling clock as the A/D converter.

A first interpolation circuit re-samples a digital equalizing output of the equalizer on the basis of the interpolating position signal and produces an interpolating signal.

A correcting position generating circuit includes a phase comparator given with an interpolating signal of the first interpolation circuit, a loop filter, and a frequency converting circuit so as to constitute a phase synchronizing loop and produces an interpolating position signal synchronized in phase with a channel clock of the reproducing signal from the frequency converting circuit to supply into an input terminal of the interpolating position signal of the first interpolation circuit.

A second interpolation circuit re-samples an output signal of the A/D converter delayed with a delay quantity corresponding to a signal delay quantity of the equalizer by a delay circuit and produces the interpolating signal.

A tap coefficient controller is given with an interpolating position signal from the interpolating position generating circuit as an interpolating position signal of the second interpolation circuit and is given with an interpolating signal output of the first interpolation circuit and an interpolating signal output of the second interpolation circuit and produces a tap coefficient.

A rate correcting circuit converts the tap coefficient produced from the tap coefficient controller to supply into the equalizer.

A binary encoder converts the output of the first interpolation circuit into a binary code and produces a reproducing data series.

More specifically, in this invention, the reproducing signal is converted by the A/D converter into the digital signal with the sampling clock having the frequency higher than the channel clock and the output of the A/D converter is equalized by the equalizer in digital with the same sampling clock.

The sampling is carried out from the output of the equalizer by the use of the PLL circuit (see Japanese Unexamined Patent Publication (JP-A) No. Hei. 10-27435).

Further, the output of the A/D converter is delayed with the same quantity as the equalizer, and is sampled by the second interpolation circuit. It is to be noted here that the interpolating position information produced from the PLL circuit is used as the interpolating position information of the second interpolation circuit.

The interpolating information before and after the equalization (the input and output signals of the equalizer) are given to the tap coefficient controller to generate the temporary tap coefficient.

The temporary tap coefficient is converted into the operation rate of the equalizer by the rate correcting circuit, and is fed-back to the equalizer.

The interpolating output from the interpolation circuit supplied with the output of the equalizer is given to the binary encoder to be produced as the reproducing date series.

In this invention, the adaptive equalizer may be divided into two systems and may include two systems of the tap coefficient controller and the rate correcting circuit.

Alternatively, the adaptive equalizer may be divided into two systems, and the tap coefficient controller and the rate correcting circuit may be selected or switched as desired.

Moreover, when the sampling clock is near the channel clock in the information detecting circuit of this invention, the tap coefficient produced from the tap coefficient controller may be directly supplied into the equalizer without passing the rate correcting circuit.

BRIEF DESCRIPTION OF THE DRAWINGS

FIG. 19 is a diagram showing an operation timing of a PLL circuit using an interpolation circuit according to an embodiment of this invention;

FIG. 21 is a diagram for explaining an embodiment of this invention and showing eye patterns before and after adaptive equalizing.

DESCRIPTION OF PREFERRED EMBODIMENTS

Figure 1:
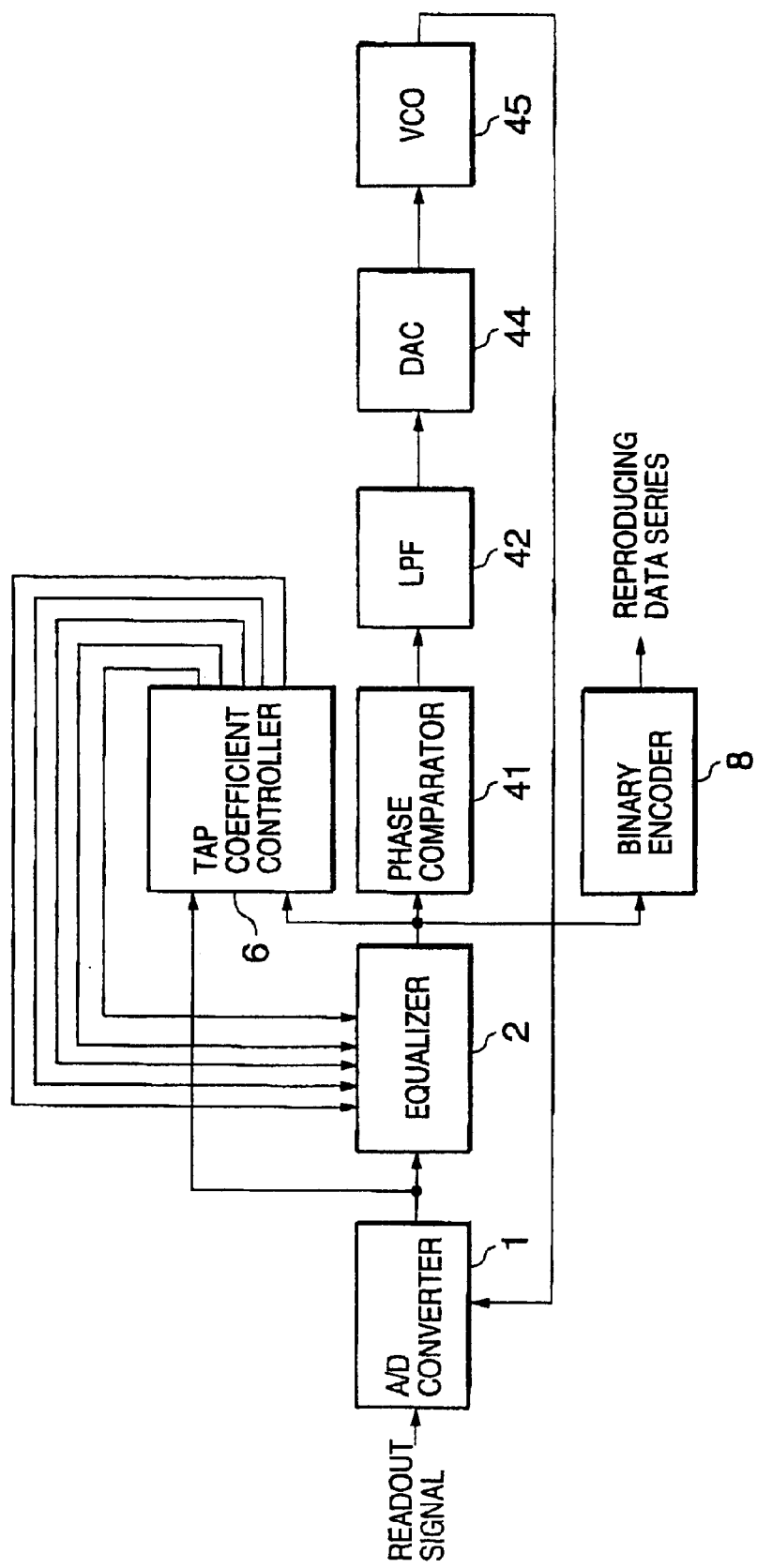
FIG. 1 is a diagram showing an example of the conventional information detecting circuit.
Figure 2:
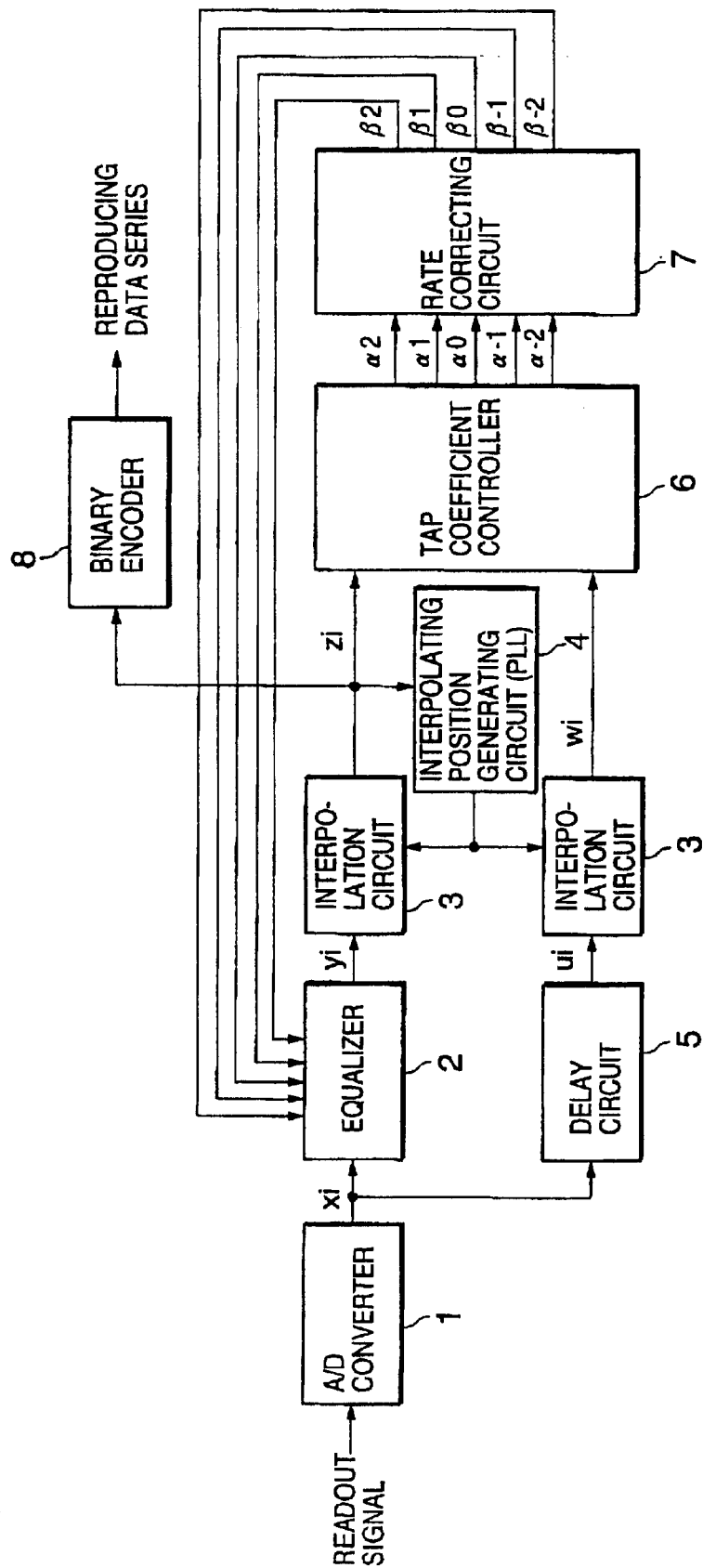
FIG. 2 is a diagram showing a first embodiment according to this invention.

Referring to FIG. 2, description will be made about a first embodiment of this invention.

A reproducing signal is given to an A/D converter 1. The A/D converter 1 samples the signal with a sampling clock having frequency higher than a channel clock and produces a sampling information xi including a digital signal.

An equalizer 2 is supplied with the sampling information xi and is operated with the sampling clock.

Herein, the output yi of the equalizer 2 is a sample series deviated with a phase information. An interpolation circuit 3 re-samples the output yi of the equalizer 2 and produces an interpolating value.

A data zi (an interpolating value after the equalization) after re-sampling in the interpolation circuit 3 is given to an interpolating position generating circuit 4. The interpolating position generating circuit 4 produces an interpolating position information and feeds-back the generated interpolating position information into the interpolation circuit 3. Herein, the interpolation circuit 3 and the interpolating position generating circuit 4 constitute a feed-back loop of a PLL (a phase synchronous loop) structure.

Thereby, a sample information series synchronized with a channel clock rate can be re-generated.

Further, the output information of the A/D converter 1 is corrected by a delay circuit 5 having a delay quantity of the same timing output as the digital equalizer 2. The interpolating information is generated from the output ui by the use of an interpolation circuit 3'.

Herein, it is noted that the interpolating position used in the interpolation circuit 3' is equal to the interpolating position information fed-back from the interpolating position generating circuit 4 into the interpolation circuit 3.

Thus, the respective interpolating information $z_i$ and $w_i$ for the input and output of the equalizer 2 are generated.

A temporary tap coefficient value αi is generated by inputting these two information into the tap coefficient controller 6.

The temporary tap coefficient is effective when the equalizer 2 operates with the channel clock. However, the equalizer 2 operates with a clock of frequency taster than the channel clock in the embodiment of this invention. Therefore, correction should be made for a ratio between the sampling clock and the channel clock. This correction is performed by a rate correcting circuit 7.

A real tap coefficient βi corrected by the rate correcting circuit 7 is fed-back into the equalizer 2, and constitutes an adaptive equalizer.

Further, the output of the correcting circuit 3 is given to a binary encoder 8 to produce a reproducing data series.

Figure 3:
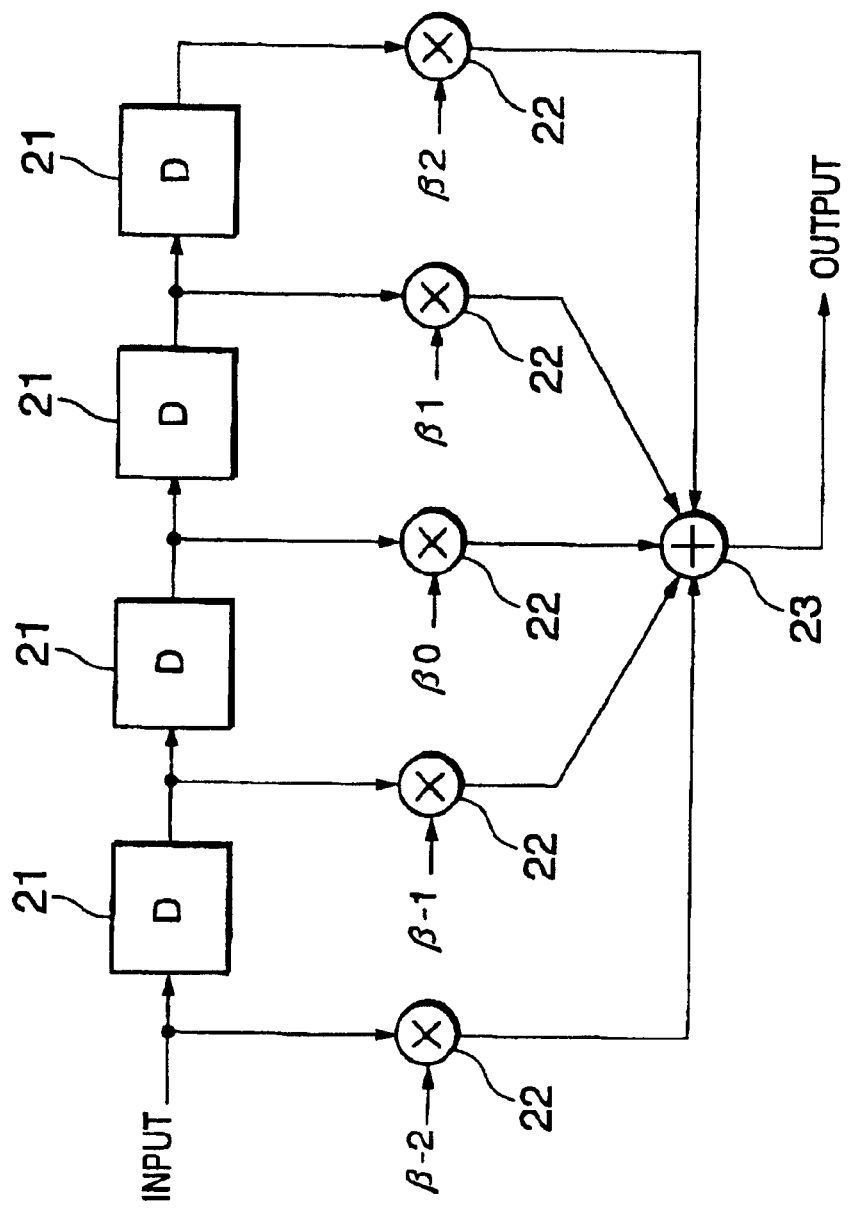
FIG. 3 is a diagram showing a digital equalizer according to a first embodiment.

Referring to FIG. 3, description will be made about the equalizer 2 according to the first embodiment of this invention.

The equalizer 2 is composed of a transversal filter of five taps which includes four of one clock delays 21, five of multipliers 2, and an adder 23.

In this embodiment, the equalizer 2 serves to change the frequency characteristic and is not restricted to the structure as illustrated in FIG. 3. It is well understood that the other filter structure may be applied.

Figure 4:
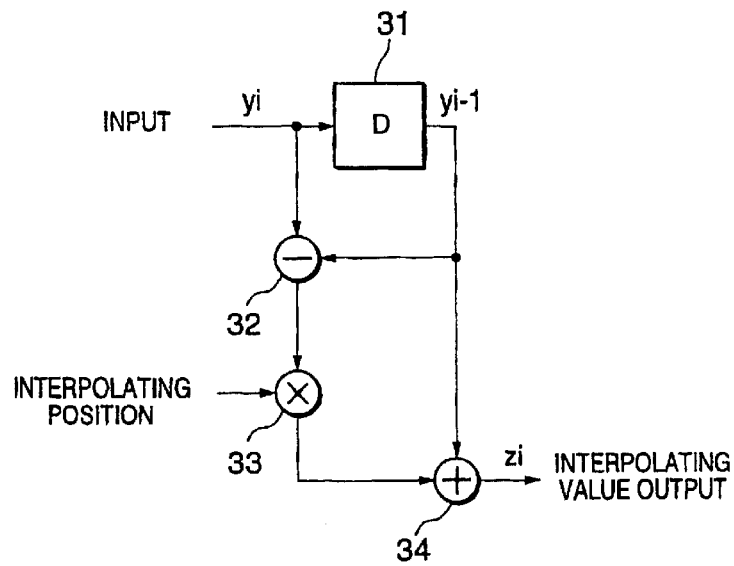
FIG. 4 is a diagram showing an interpolation circuit according to a first embodiment.

Referring to FIG. 4, description will be made about the interpolation circuit 3 according to the embodiment of this invention.

The interpolation circuit 3 is provided with one clock delay 31 and carries out a linear interpolation by using an information $y_{i-1}$ before one timing (before one clock) and an information $y_i$ of a present timing.

The linear interpolation is realized by the use of the following equation (1) when the interpolating position is set to $k (0 \leq k \leq 1)$.

$$z_{i-1} + k(y_i - y_{i-1}) \tag{1}$$

Specifically, the output $y_{i-1}$ of the one clock delay 31 and the recent sample signal $y_i$ are given to a subtracter 32, and a signal $(y_i - y_{i-1})$ is produced from the subtracter 32. The signal k $(y_1 - y_{i-1})$ becomes k times by the multiplier 33. The signal k $(y_1 - y_{i-1})$ is added with $y_{i-1}$ by tile adder 34 to produce an interpolating value output $z_1$. Herein, the interpolation may be carried out with higher degree in the embodiment of this invention.

Figure 5:
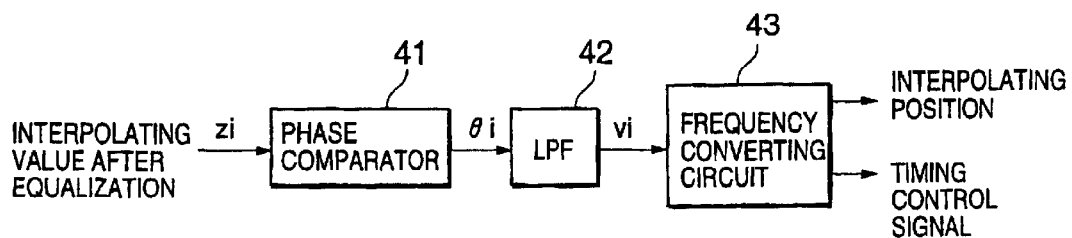
FIG. 5 is a diagram showing an interpolating position generating circuit according to a first embodiment.

Referring to FIG. 5, description will be made about the interpolating position generating circuit 4.

The input information zi is converted into a phase information θi by a phase comparator 41. The phase information θi is integrated by a low pass filter (LPF) 42 to produce a frequency information Vi. Although Vi follows to time elapse quite slowly, a frequency converting circuit 43 produces the interpolating position information from Vi.

Figure 18:
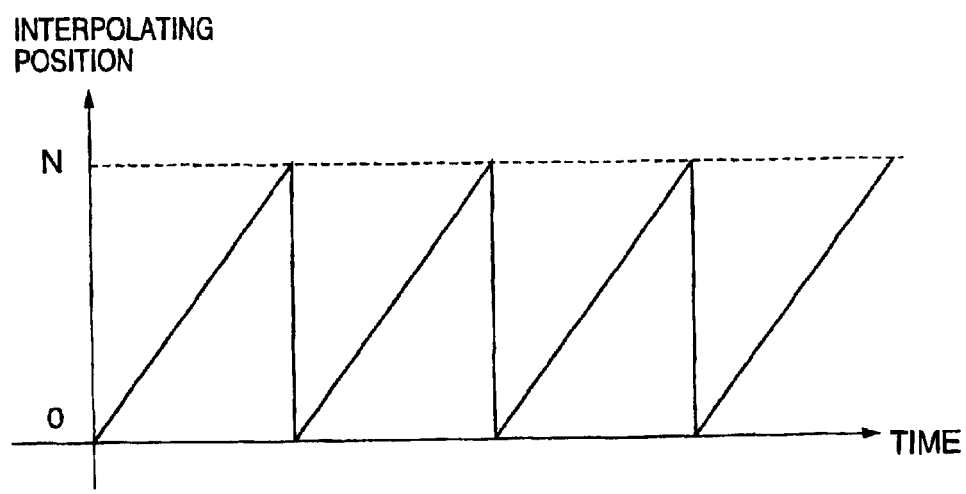
FIG. 18 is a diagram for explaining an operation of an interpolating position converter according to an embodiment of this invention.

FIG. 18 show an example of a signal waveform of the interpolating position information produced from the frequency converting circuit 43.

As illustrated in FIG. 18, the interpolating position information is a function of a sawtooth waveform, and the slope of the waveform becomes a function of the frequency. When frequency deviation quantity is low, the slope is not that steep. On the other hand, when the frequency deviation quantity is high, the slope is steep.

As the sampling frequency is higher than the frequency of the reproduction channel, the difference therebetween is compensated by halting the operation of the synchronizing circuit at where the interpolating position becomes discontinuous.

FIGS. 19A through FIG. 19D are signal waveform diagrams showing the relationship of the input yi and the output zi of the interpolation circuit 3, the interpolating position information serving as the output of the interpolating position generating circuit 4, and the timing control signal.

As illustrated in FIGS. 19A through 19D, when the interpolating position is gradually deviated and the interpolation can not be performed, the timing control signal lowers at a low level so that the circuit operation is contemporarily halted. The frequency converting circuit 43 generates the signal for controlling the operation timing of the circuit.

The timing control signal controls the circuit operation of a circuit group (for example, the interpolation circuits 3, 3') connected to the interpolating position generating circuit 4, although not illustrated.

Figure 6:
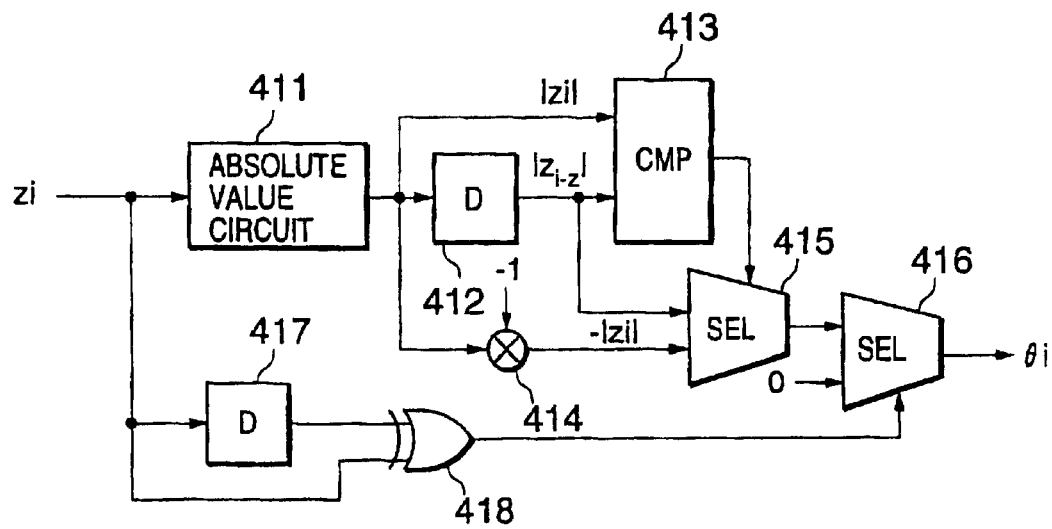
FIG. 6 is a diagram showing a phase comparator in an interpolating position generating circuit according to a first embodiment.

FIG. 6 is a diagram showing the phase comparator 41 in the interpolating position generating circuit 4 according to the embodiment of this invention.

Referring to FIG. 6, the input information (an interpolating value after equalization) $z_i$ is given to an absolute value circuit 411, is produced with the absolute value, and is delayed by the one clock delay 412 Further, input information absolute values $|z_i|$, $|z_{i-1}|$ at continuous two timings are given to the comparator (CMP) 413 to be compared.

Moreover, the present input information absolute value $|z_i|$ is given with a minus code by a multiplier 414, and—$|z_i|$ and the input information absolute value $|z_{i-1}|$ before one timing are given to a selector 415. The selector 415 selects either one based upon the comparison result of the comparator 413. Thereby, the selector 415 again attaches a code for the smaller one, and produces the one.

A one clock delay 417 and an exclusive logic circuit 8 produce a timing signal in which a code of an input interpolating signal zi is variable, and gate the output of a selector 416. Herein, it is noted that the pulse width of the above-mentioned timing signal is equal to a delay time of the one clock delay 417.

With such a structure, the phase information when the input information series transfers a zero level can be produced or extracted.

Figure 7:
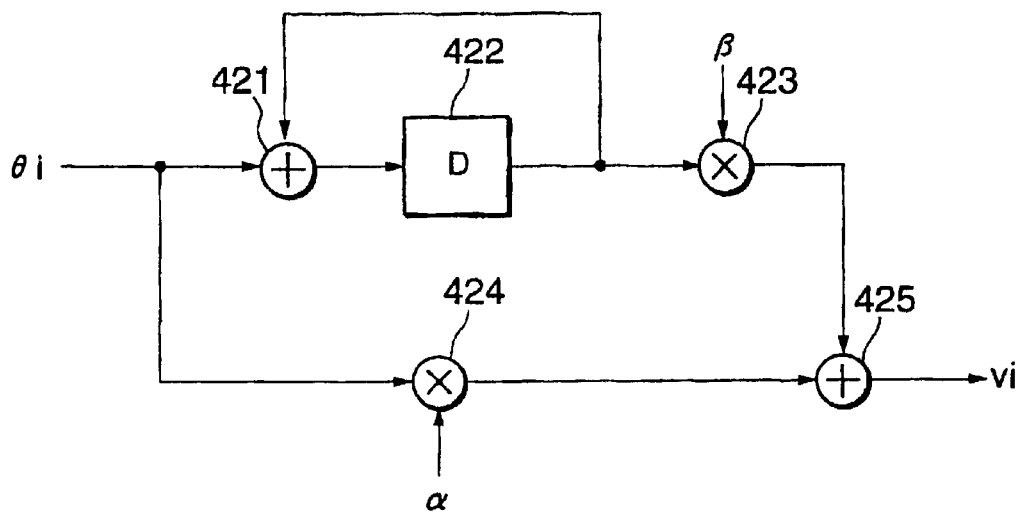
FIG. 7 is a diagram showing LPF in an interpolating position generating circuit according to a first embodiment.

FIG. 7 is a diagram showing the loop filter (a low pass filter LPF) 42 in the interpolating position generating circuit 4 according to this invention.

Referring to FIG. 7, an input phase information θi is integrated by an adder 421 and a one clock delay 422 to produce a frequency information.

Further, the integrated result is made with β times by the use of a multiplier 423. The input phase θi is made with α times by the use of a multiplier 424.

The both values are added by an adder 425 to produce a frequency information Vi. Thereby, the frequency and the phase can be simultaneously controlled.

Figure 8:
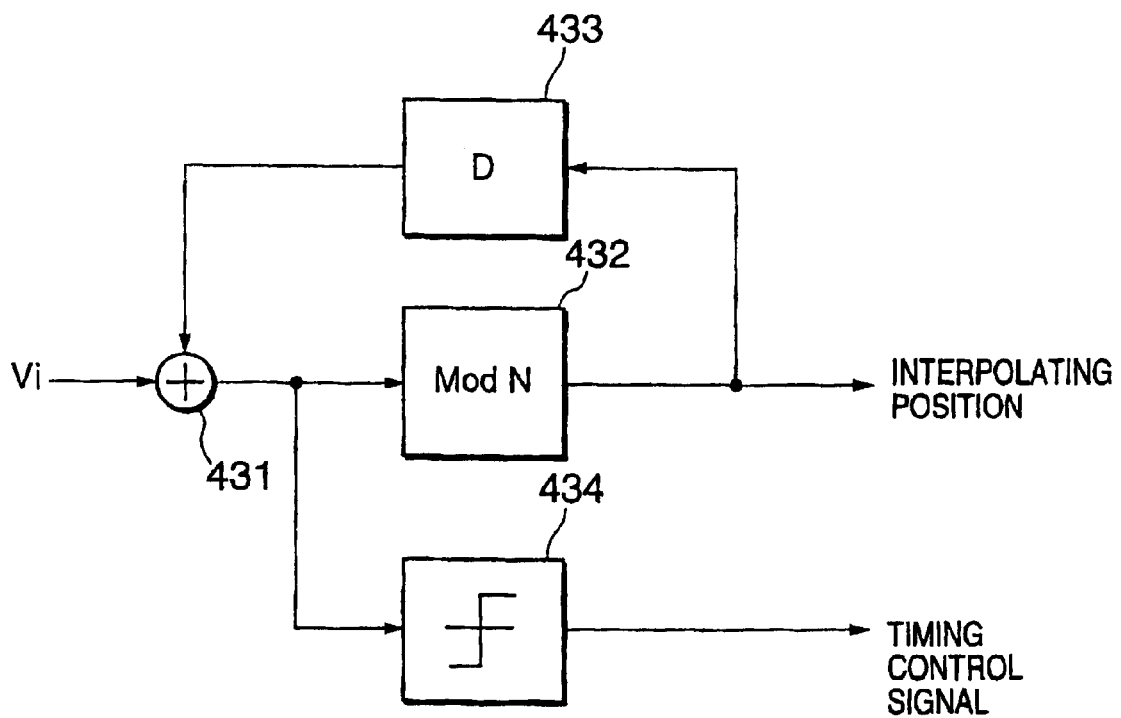
FIG. 8 is a diagram showing a frequency converter in an interpolating position generating circuit according to a first embodiment.

FIG. 8 shows the frequency converting circuit 4 in the interpolating position generating circuit 43 according to an embodiment of this invention. Herein, the frequency converting circuit 43 produces the signal (the interpolating position information) of the sawtooth waveform illustrated in FIG. 18 from the input frequency information Vi.

Referring to FIG. 8, a Mod function (an excess calculating circuit) 432 is inserted in an integrator composed of an adder 431 and an one clock delay 433 in the frequency converting circuit 43. Herein, it is to be noted that N is defined as a rule in the Mod function.

Further, the output of the adder 431 is compared in a comparator 434 using N as a threshold value. The discontinuous timing or the operation timing control signal illustrated in FIG. 18 is generated from the comparator 434.

Figure 9:
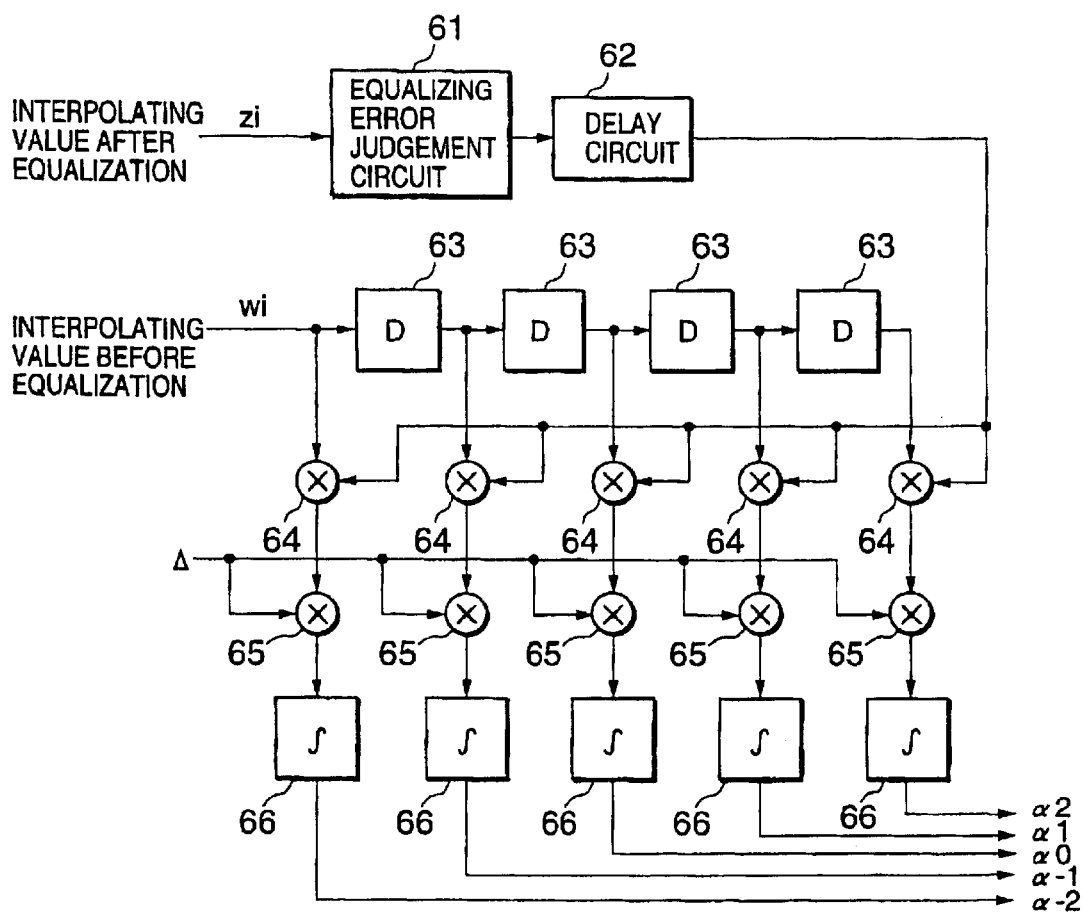
FIG. 9 is a diagram showing a tap coefficient controller according to a first embodiment.

FIG. 9 shows the tap coefficient controller 6 according to the embodiment of this invention. The input information (the interpolating value after equalizing) $z_i$ is given to an equalizing error judgement circuit 61 to produce an equalizing error information at every samples If the equalization is completely carried out, this value becomes zero.

The equalizing error information is given to a multiplier 64 after correcting timing by a delay circuit 62. The input information before the equalization (the interpolating value before the equalization) wi produces the input information deviated with every one timing to give for the multiplier 64.

The outputs of the multiplier 64 are multiplied a gain of $\Delta$ times by a multiplier 65, respectively, and are given to integrators 66. Namely, the correlation between the information before the equalization and the error information is calculated, and an adaptive equalizer, in which the coefficient is corrected, is structured such that the correlation is minimized.

FIGS. 21A and 21B shows the eye-patterns before and after the equalization when a reproducing signal of an optical disk, in which an inter-symbol interference appear, is given to the adaptive equalizer.

As illustrated in FIG. 21, the eye-pattern gradually converges to the two-value (the amplitude level is ±A) by inputting the signal. In this case, the converging rate can be adjusted in dependence upon the value of $\Delta$.

Figure 10:
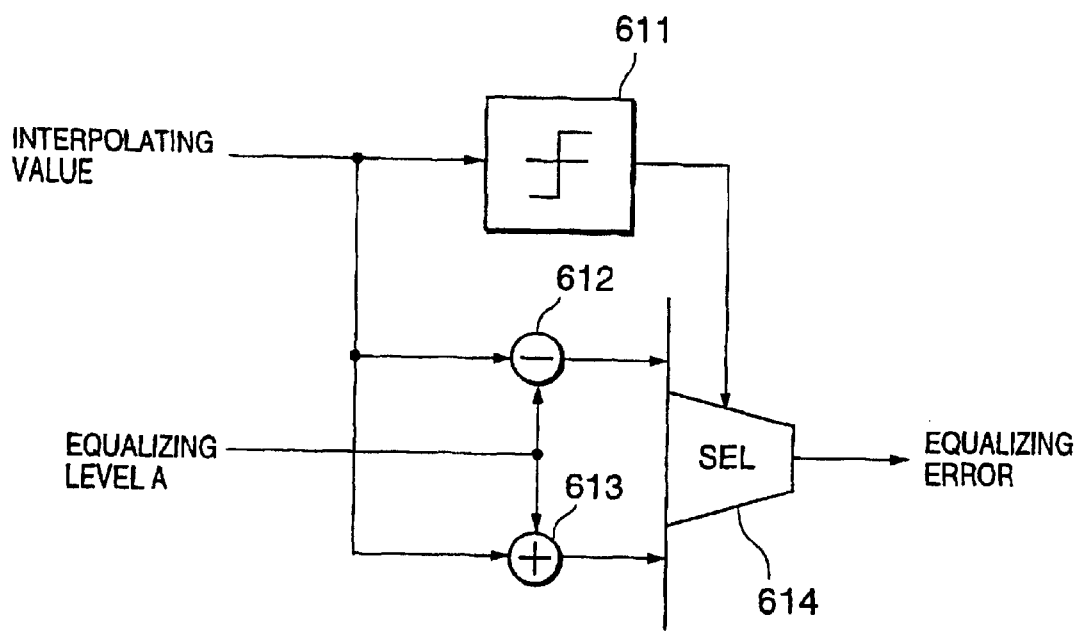
FIG. 10 is a diagram showing an equalizing error judgement circuit in a tap coefficient controller according to a first embodiment.

FIG. 10 is shows the equalizing error judgement circuit 61 (referring to FIG. 9) in the tap coefficient controller 6 according to the embodiment of this invention. The structure illustrated in FIG. 10 has the error judgement circuit for two-valuing into a level of ±A.

A substractor 612 and an adder 613 given with the equalizing level A generate $z_i-A$ and $z_i+A$, respectively. Either one of $z_i-A$ and $z_i+A$ is selected and produced in accordance with the polarity of the interpolating value by a selector 613 which utilizes an output of a comparator 611 given with the interpolating value as a selecting signal. Herein, the output of the comparator 611 is the signal indicating the polarity of the interpolating value.

Figure 11:
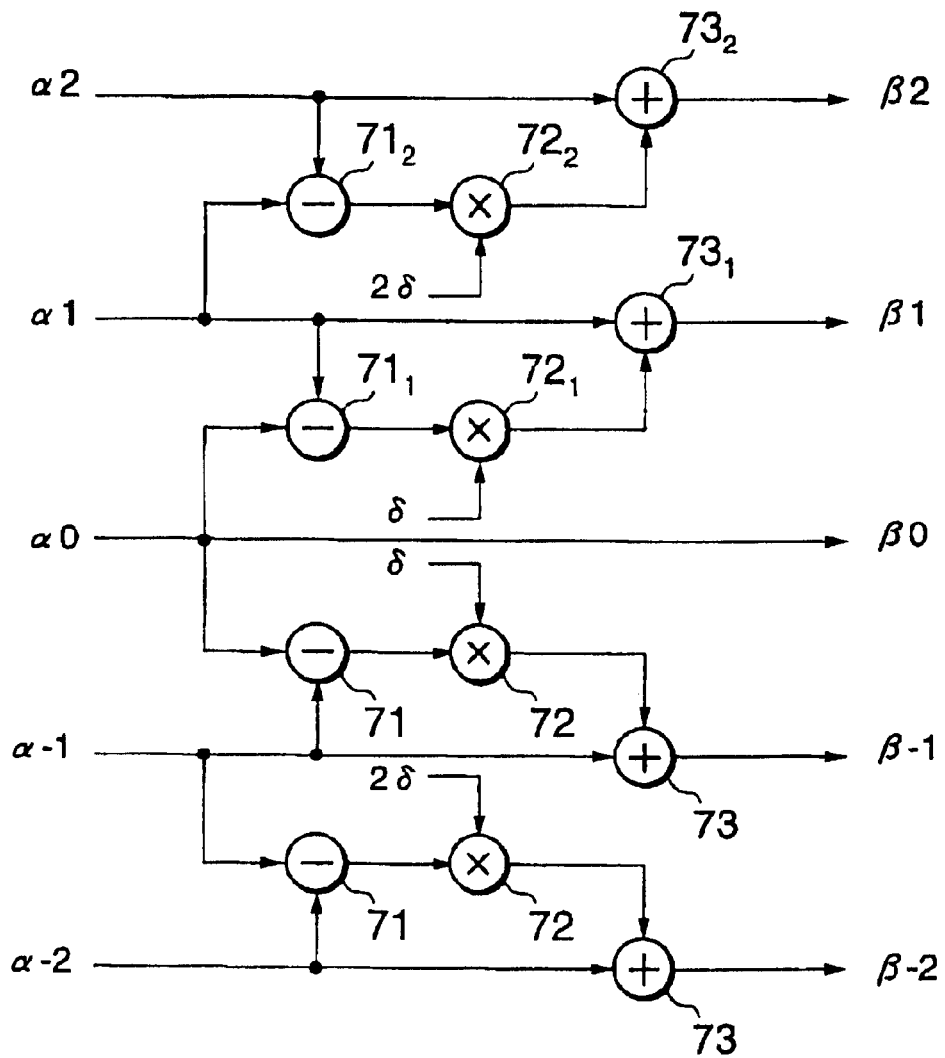
FIG. 11 is a diagram showing a rate correcting circuit according to a first embodiment.

FIG. 11 shows the rate correcting circuit 7 according to the embodiment of this invention. Herein, description will be made about the necessity of the rate correcting circuit 7.

Figure 20A:
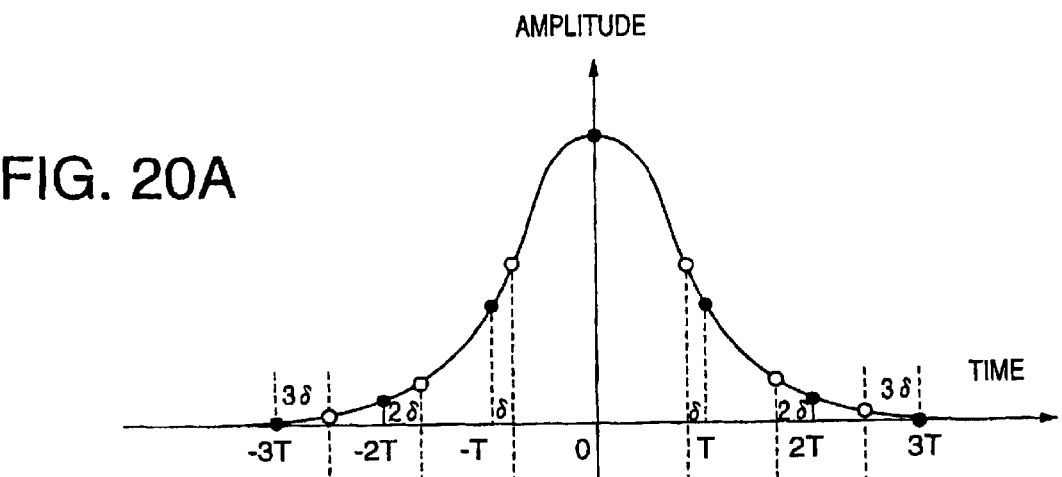
FIG. 20 is a diagram showing an input-output corresponding relationship of an rate correcting circuit according to an embodiment of this invention.

FIG. 20A shows a waveform, namely a response characteristic of a head medium when a 1 T mark recorded in the medium surface of the optical disk is read-out.

The reproducing waveforms of the various mark patterns can be basically expressed by the overlapping of the response waveforms of the 1 T mark. Therefore, consideration will be made about the response waveform of 1 T.

Black circles (●) in FIG. 20A are sampled with the nature channel clock $f_0$ while white circles (○) are sampled with the sampling rate $f_1$ higher than the channel clock.

When the center of the waveform is used as the basis, the difference between the white circle and the black circle increases in accordance with the distance from the center of the waveform so as to deviate with $\delta$, $2\delta$, and $3\delta$.

Herein, T (the frequency of the channel clock $f_0$) and $\delta$ (the timing difference between the channel clock and the sampling clock) is represented by the following equation (2).

$$T=1/f_0$$
$$\delta=1/f_0-1/f_1 \quad (2)$$

Figure 20B:
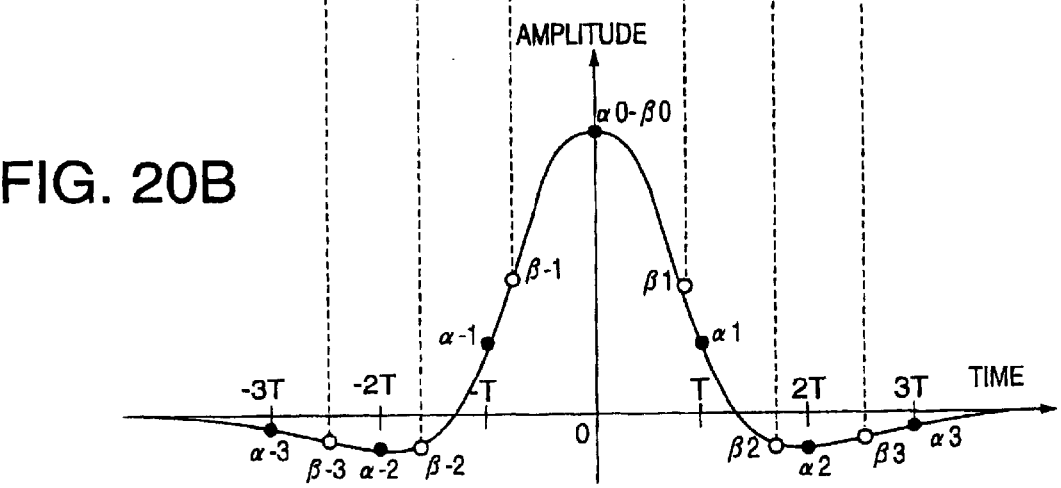

Subsequently, FIG. 20B shows the response characteristic of the equalizer 2. The tap coefficient of the equalizer 2 becomes the amplitude value of the response waveform in itself.

The black circle ($\alpha i$) is the tap coefficient value which is adaptively equalized and converged by the use or the nature channel clock.

When the black circle sample value series in FIG. 20A passes through the equalizer 2, a proper adaptive equalizing waveform can be obtained.

However, when the equalizer 2 is operated with a rapider frequency than the channel clock, an improper equalizing waveform is obtained with the tap coefficient.

Therefore, in the case where the equalizer 2 is operated with the rapider frequency than the channel clock, the coefficient value $\alpha i$ obtained from the tap coefficient controller 6 is corrected with the ratio between the channel clock and the sampling clock. This is the tap coefficient $\beta i$ indicated by the white circle (○) in FIG. 20B.

This conversion is carried out by interpolating a $\alpha i$. When the linear interpolating is performed by the following equation (3).

In the case of $i \geq 0$, $\beta i = \alpha i - i \times (\alpha i - \alpha i - 1) \times \delta$ In the case of $i < 0$, $\beta i = \alpha i - i \times (\alpha i + 1 - \alpha i) \times \delta$ $\quad (3)$ FIG. 11 shows an example of a circuit structured by the above equation (3). The circuit illustrated in FIG. 11 is composed of m-subtracters 71, multipliers 72, and adders 73.

For example, $\beta 1$ is obtained by adding $\alpha 1$ by the adder $73_1$ for the value multiplied with $\delta$ by the multiplier $72_1$ to the output $(\alpha 0 - \alpha 1)$ of the subtracter $71_1$ given with $\alpha 1$ and $\alpha 0$.

$\beta 2$ is obtained by adding $\alpha 2$ by the adder $73_2$ for the value multiplied with $2\delta$ by the multiplier $72_2$ to the output $(\alpha 1 - \alpha 2)$ of the subtracter $71_2$ given with $\alpha 2$ and $\alpha 1$.

The proper rate correction becomes possible by setting the interpolating function to higher degree as needed. Herein, it is noted that the rate correction can be sufficiently replaced by the linear interpolation when $\delta$ is small.

Subsequently, description will be made about a second embodiment with reference to FIG. 12.

Figure 12:
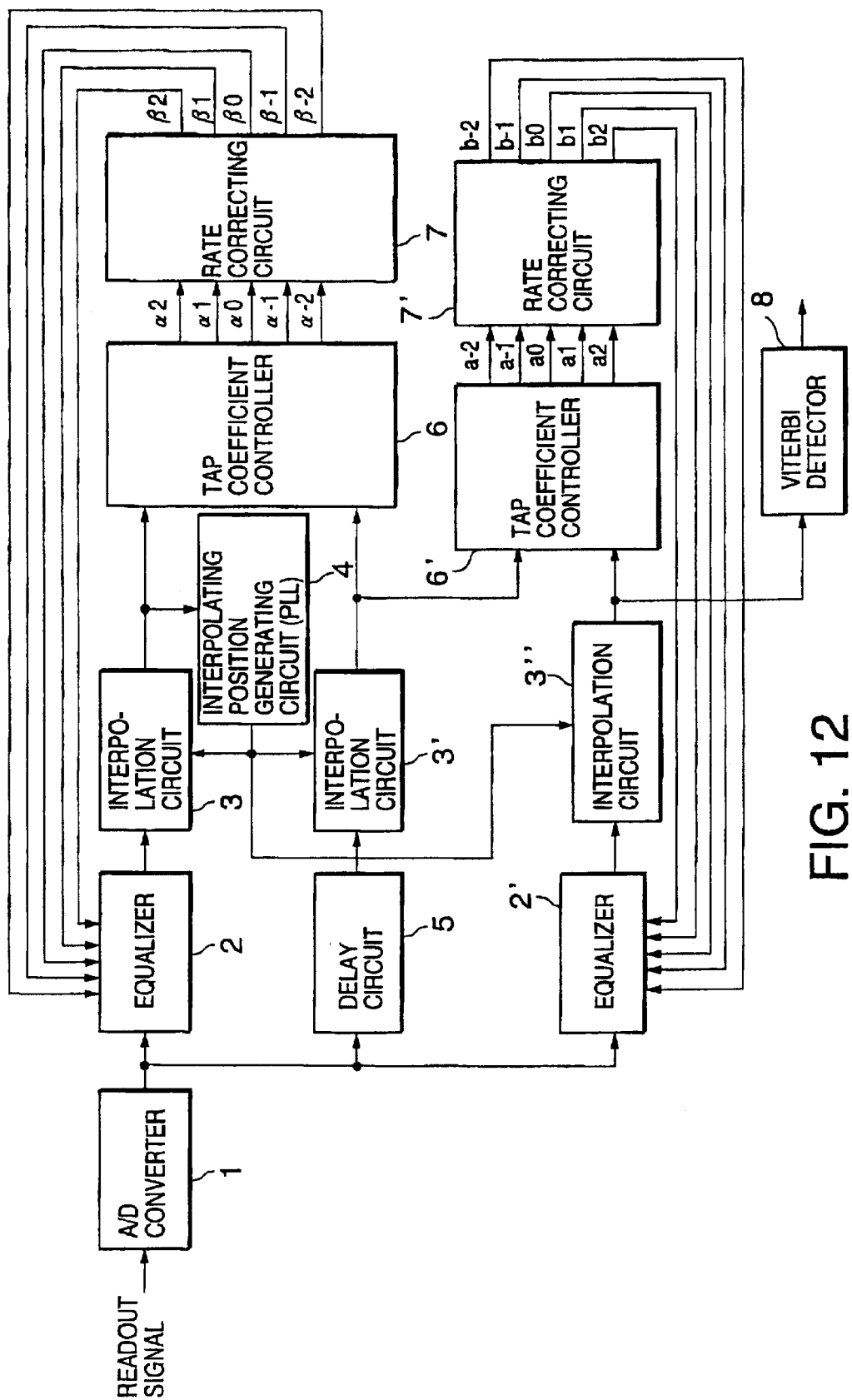
FIG. 12 is a diagram showing a structure according to a second embodiment.

In FIG. 12, the same reference numbers are attached to the same or equivalent components as the components illustrated in FIG. 2.

When the waveform is equalized such that the resolution becomes low utilizing a PR response waveform of the higher degree, the higher detecting performance can be obtained in the Viterbi detector.

However, it is difficult to extract the clock from such a waveform. Consequently, the nature detecting performance can not be realized in the Viterbi detector having large jitter (fluctuation) of the clock. Therefore, it is preferable to separately provide the equalizer for the PLL and the equalizer for the Viterbi detector.

The second embodiment includes two systematic adaptive equalizers.

Referring to FIG. 12, an A/D converting information is equalized by an equalizer 2, and is adaptively equalized by the PLL. Such a structure is equivalent to the structure illustrated in FIG. 2.

In addition, the equalization different from the equalizer 2 is carried out by the use of the equalizer 2', and the interpolating value is produced in the interpolation circuit 3".

In this event, the value produced from the output information of the equalizer 2 is used as the interpolating position information.

The output of the interpolation circuit 3" is given to the tap coefficient controller 6', and is corrected in rate by the rate correcting circuit 7'. Thereby, the tap coefficient value information of the equalizer 2' is fed-back. The output of the interpolation circuit 3" is simultaneously given to the Viterbi detector 8' to generate the reproducing date series.

Figure 13:
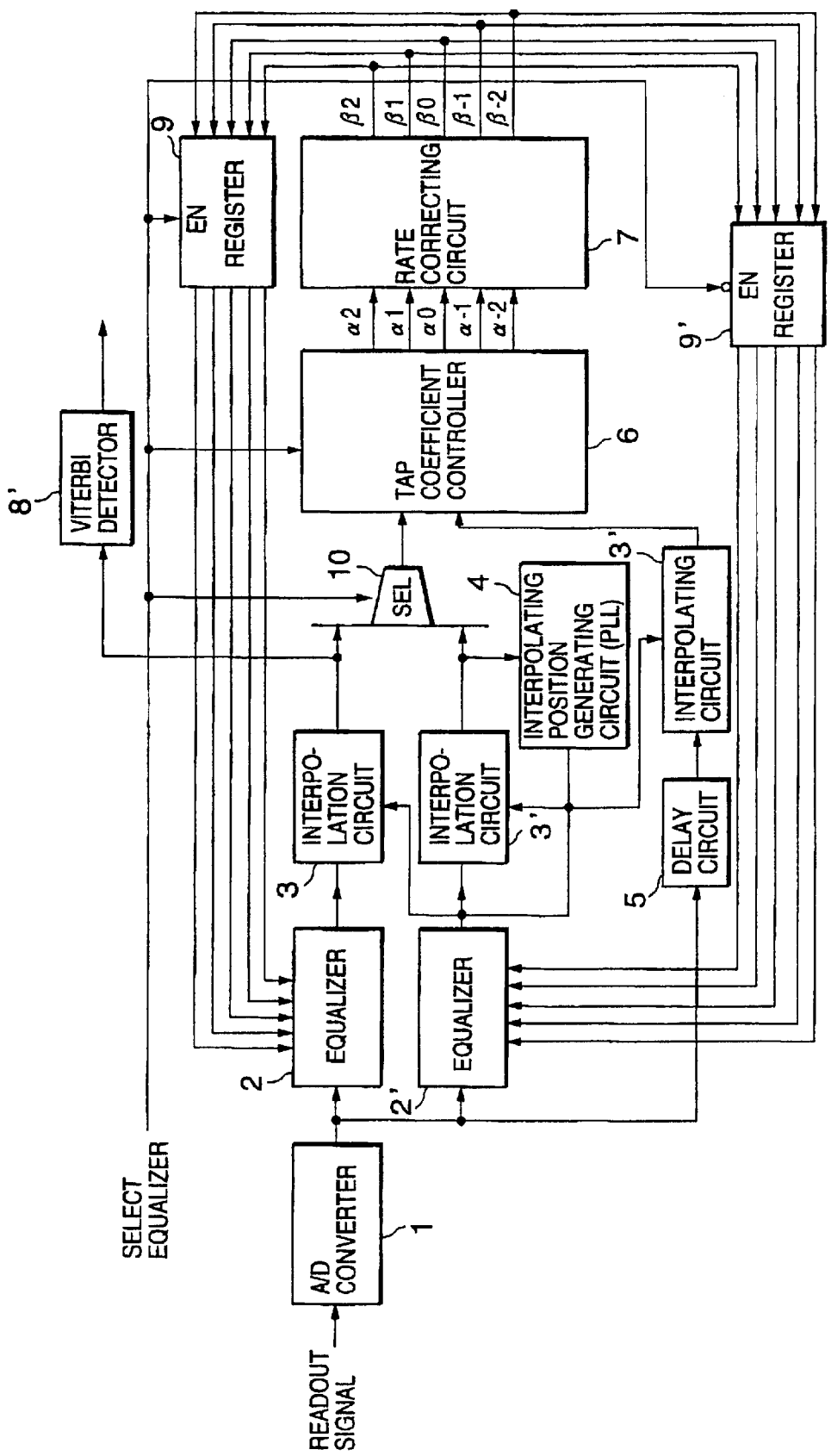
FIG. 13 is a diagram showing a structure according to a third embodiment.

Referring to FIG. 13, description will be made about a third embodiment of this invention. In FIG. 13, the same reference numbers are attached to the same or equivalent components as the components illustrated in FIG. 2.

The above-mentioned second embodiment is provided with the two systematic adaptive equalizer. In this case, the tap coefficient controller is composed of a plurality of multipliers and integrators. Consequently, the circuit scale becomes large.

Therefore, the tap coefficient controller 6 and the rate correcting circuit 7 are time-shared by the two systematic equalizers. Thereby, the circuit scale can be reduced.

The interpolating output (the output of the interpolation circuit 3) of the equalizer 2 and the interpolating output (the output of the interpolation circuit 3') of the equalizer 2' are selected by the selector 10, and the selected output is given to the tap coefficient controller 6.

Further, the outputs of the rate correcting circuit 7 are shared into the two systems, and are given to a register 9 and a register 9', respectively. The respective outputs of the registers are given to the equalizer 2 and the equalizer 2', respectively.

The adaptive correction of either one system is carried out by the use of the equalizing selection signal. In this event, the internal state of the tap coefficient controller 6 can be changed by the equalizing selection signal.

Figure 14:
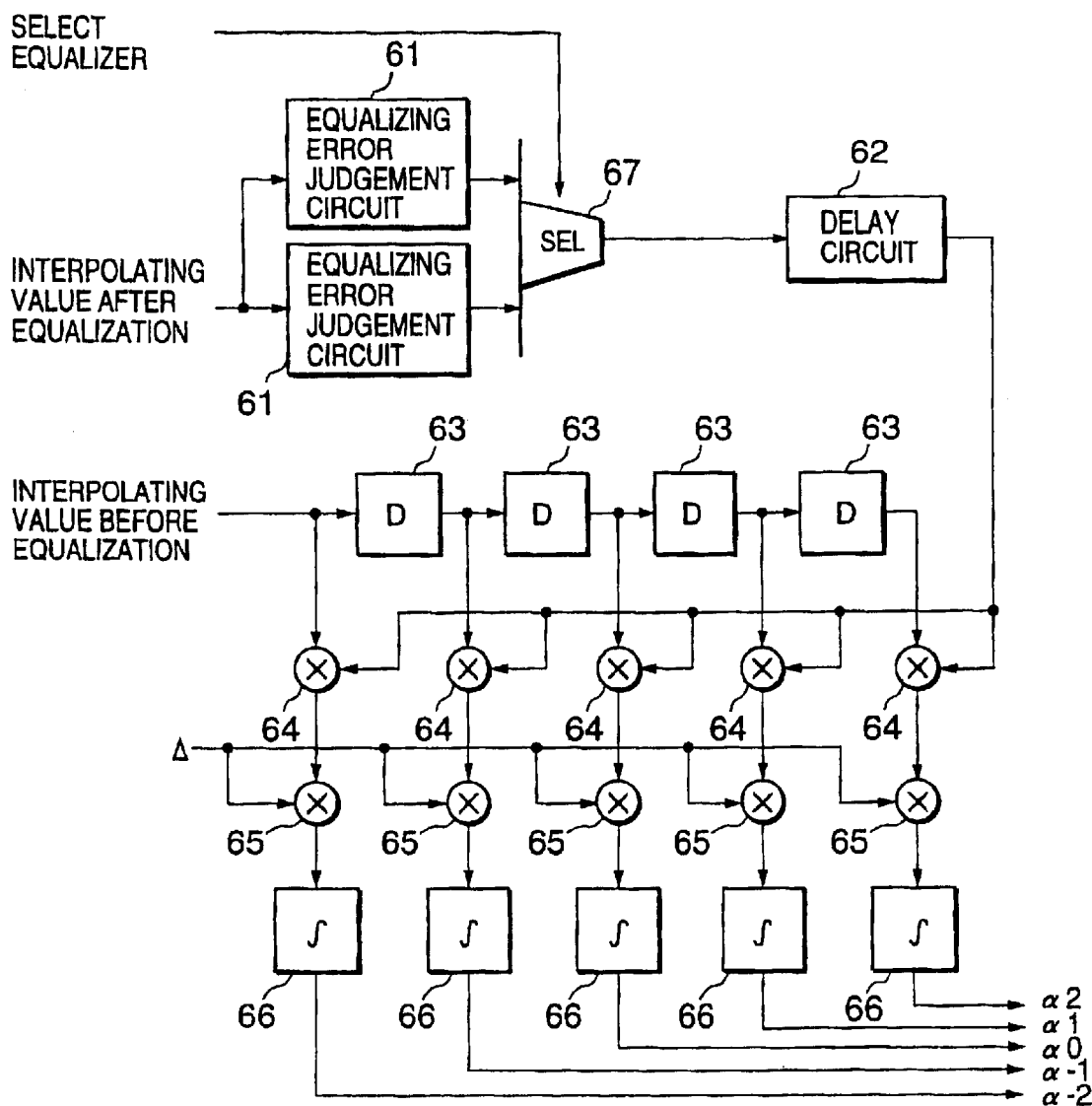
FIG. 14 is a diagram showing a tap coefficient controller according to a third embodiment.

FIG. 14 shows the tap coefficient controller 6 according to the third embodiment of this invention.

Referring to FIG. 14, the tap coefficient controller 6 has a selector 67 for inputting the equalizing selection signal as the selecting signal.

This selector 67 can select an output of an equalizing error judgement unit 61 and an output of an equalizing error judgement unit 61' for performing another equalization. This structure is different from the structure illustrated in FIG. 9.

Figure 15:
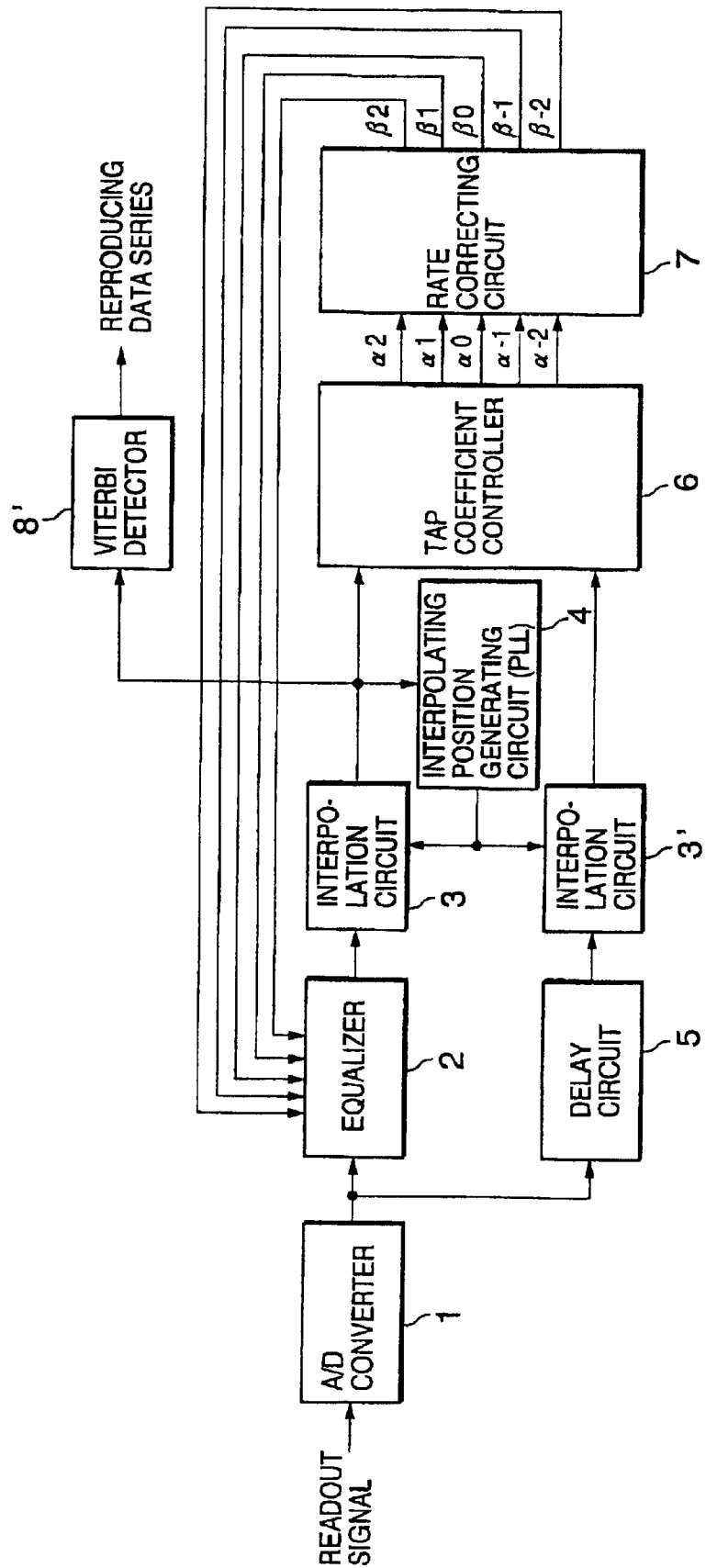
FIG. 15 is a diagram showing a structure according to a fourth embodiment.

Subsequently, description will be made about a fourth embodiment with reference to FIG. 15. The basic structure of the fourth embodiment is similar to the embodiment illustrated in FIG. 2.

In the fourth embodiment, the Viterbi detector is additionally used as the binary encoder 8' to enhance the detecting performance of the reproducing data series.

Subsequently, description will be made about a fifth embodiment with reference to FIG. 16.

When the frequency fluctuation of the channel clock of the reproducing signal is relatively small, the sampling rate can considerably correspond to the channel clock.

Specifically, when the timing difference δ between the sampling rate and the channel clock (referring to the above-mentioned equation (1)) is approximately near to zero, it is possible to ignore the rate correction.

Figure 16:
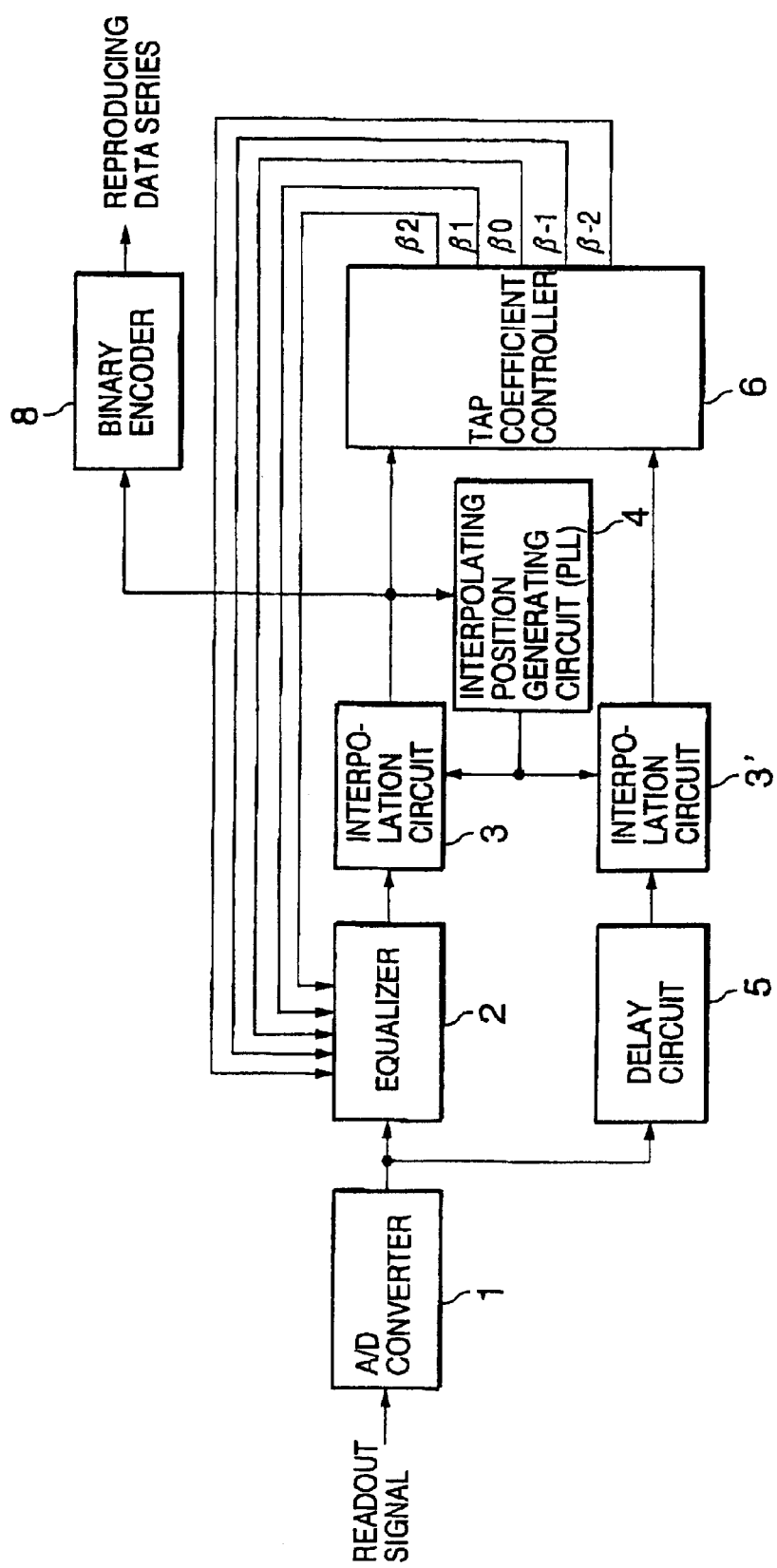
FIG. 16 is a diagram showing a structure according to a fifth embodiment.

Referring to FIG. 16, the rate correcting circuit (the reference numeral 7 in FIG. 7) is abbreviated or omitted in the fifth embodiment, and the equalizer 2 is directly controlled by the use of the output of the tap coefficient controller 6.

Subsequently, description will be made about a sixth embodiment of this invention with reference to FIG. 17. An optical disk device illustrated in FIG. 17 is provided with the information detecting circuit including the adaptive equalizer shown in FIGS. 2 through 6.

Figure 17:
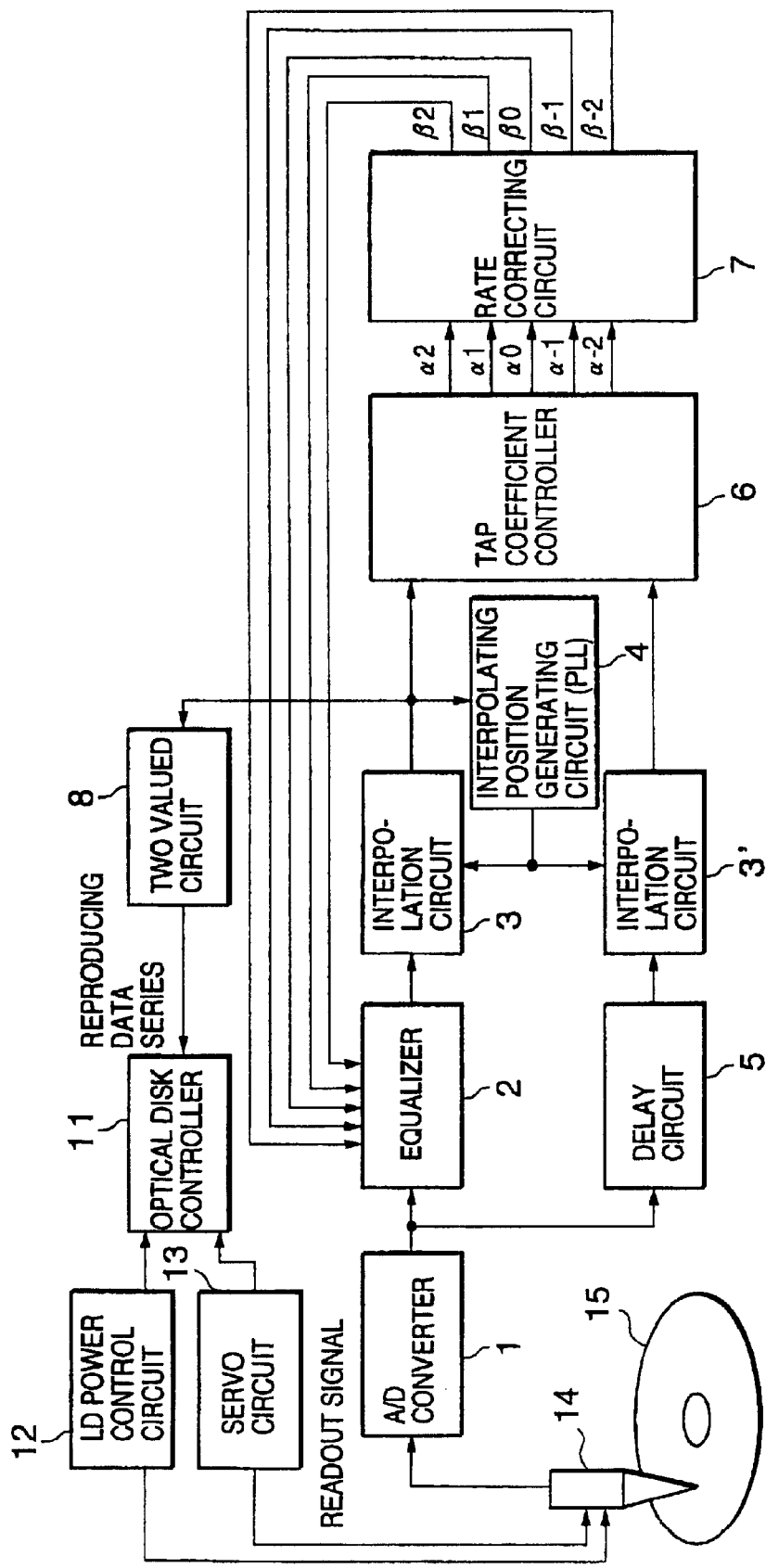
FIG. 17 is a diagram showing a structure according to a sixth embodiment.

Referring to FIG. 17, a laser spot focussed into an optical disk medium 15 is accurately positioned by a servo circuit 13 so as to follow up. Laser is constantly controlled by a LD power control circuit 12. The serve circuit 13 and the LD power control circuit 12 is controlled by the use of an optical disk controller 11.

A reflection light beam from the optical disk medium 15 is read-out as an optical pit information by an optical head 14 in accordance with a physical state on a medium surface. A reproducing signal outputted from the optical head 14 is converted into a digital information by an A/D converter 1.

The digital information produced from the A/D converter 1 is equalized in waveform by a digital equalizer 2, and is corrected to a proper information (an interpolating value) in an interpolation circuit 3.

Thereafter, a tap coefficient is generated in a tap coefficient controller 6, and the tap coefficient is converted for the digital equalizer 2 in the rate correcting circuit 7, and is fed-back to the digital equalizer 2. With such a structure, the adaptive equalization can be realized.

The output of the interpolation circuit 3 is given to the interpolating position generating circuit 4, and is fed-back again to the interpolation circuit 3. With this structure, the PLL loop is constituted.

Further, the output of the interpolation circuit 3 is given to the binary encoder 8 to produce the reproducing data series, and is given to the optical disk controller 11.

As mentioned above, the PLL circuit can have the short loop delay, and can adaptively follow the variation of the signal quality according to this invention.

This is because the sampling interpolating PLL system, which reproduces the ideal sampling series by the interpolation by sampling the clock different from the channel clock, is combined with the adaptive equalizer in the circuit structure according to this invention.

Further, the reliability of the device can be enhanced in the optical disk device according to this invention.

While this invention has thus far been disclosed in conjunction with several embodiments thereof, it will be readily possible for those skilled in the art to put this invention into practice in various other manners.

What is claimed is:

1. An information detecting circuit, comprising:
   an A/D converter which samples a reproducing signal with a frequency higher than a channel clock of the reproducing signal;
   an equalizer which equalizes an output from the A/D converter as an A/D converting information;
   a first interpolation circuit which generates an interpolating value from an output value series of the equalizer;
   a delay circuit which delays the A/D converting information with a delay quantity equivalent to an output delay quantity of the equalizer and which produces the delayed information;
   a second interpolation circuit which generates an interpolating value from an output value series of the delay circuit;
   an interpolating position generating circuit which produces an interpolating position information for generating an interpolating value synchronized in phase with the channel clock of the reproducing signal from an output of the first interpolation circuit and which supplies the interpolating position information into the first interpolation circuit and the second interpolation circuit;
   a binary encoder which converts the output of the first interpolation circuit and produces a reproducing data series;
   a tap coefficient controller which generates a tap coefficient from an interpolating value output of the first interpolation circuit and an interpolating value output of the second interpolation circuit; and a rate correcting circuit which converts the tap coefficient produced from the tap coefficient controller for the equalizer;

the tap coefficient converted for the equalizer by the rate correcting circuit being fed-back to the equalizer.

2. An information detecting circuit claimed in claims 1, wherein:

the tap coefficient produced from the tap coefficient controller is directly supplied to the equalizer without passing the rate correcting circuit.

3. An information detecting circuit claimed in claim 1, wherein:

each of the first and second interpolation circuits produces the interpolating value based upon a signal of one sample clock or a plurality of sample clocks proceeding an inputted present signal value and the interpolating position information by linearly interpolating or interpolating with higher degree.

4. An information detecting circuit claimed in claim 1, wherein:

the interpolating position generating circuit includes;
  a phase comparator which converts an input information into a phase information,
  a low pass filter which is given with an output of the phase comparator, and
  a frequency converting circuit which generates the interpolating position information on the basis of a frequency information as output of the low pass filter.

5. An information detecting circuit claimed in claim 4, wherein:

the frequency converting circuit includes;
  means for producing an interpolating position signal of a sawtooth waveform having a slope corresponding to a deviation quantity of the frequency, and
  means for producing a timing control signal for halting an operation of the circuit in a portion where the interpolating position signal becomes discontinuous.

6. An information detecting circuit claimed in claim 1, wherein:

the rate correcting circuit produces a tap coefficient obtained by correcting the tap coefficient value produced from the tap coefficient controller with one or higher degree of a timing difference between the channel clock and the sampling clock.

7. An information detecting circuit claimed in claim 1, wherein;

the binary encoder comprises a Viterbi detector.

8. An information detecting circuit, comprising:

an A/D converter which samples a reproducing signal with a frequency higher than a channel clock of the reproducing signal;

a first equalizer which equalizes an output from the A/D converter as an A/D converting information;

a first interpolation circuit which generates an interpolating value from an output value series of the first equalizer;

a delay circuit which delays the A/D converting information with a delay quantity equivalent to an output delay quantity of the first equalizer and which produces the delayed information;

a second interpolation circuit which generates an interpolating value from an output value series of the delay circuit;

a second equalizer which equalizes the A/D converting information;

a third interpolation circuit which generates an interpolating value from an output value series of the second equalizer;

an interpolating position generating circuit which produces an interpolating position information for generating an interpolating value synchronized in phase with the channel clock of the reproducing signal from an output of the first interpolation circuit and which supplies the interpolating position information into the first interpolation circuit, the second interpolation circuit and the third interpolation circuit;

a first tap coefficient controller which generates a tap coefficient from an interpolating value output of the first interpolation circuit and an interpolating value output of the second interpolation circuit; and a first rate correcting circuit which converts the tap coefficient produced from the first tap coefficient controller for the first equalizer;

a second tap coefficient controller which generates a tap coefficient from an interpolating value output of the second interpolation circuit and an interpolating value output of the third interpolation circuit; and a second rate correcting circuit which converts the tap coefficient produced from the second tap coefficient controller for the second equalizer; and a binary encoder which converts the output of the third interpolation circuit and which produces a reproducing date series;

the tap coefficient produced from the first rate correcting circuit being fed-back into the first equalizer, and the tap coefficient produced from the second rate correcting circuit being fed-back into the second equalizer.

9. An information detecting circuit claimed in claim 8, wherein:

the tap coefficient produced from the tap coefficient controller is directly supplied to the equalizer without passing the rate correcting circuit.

10. An information detecting circuit claimed in claim 8, wherein:

each of the first, second and third interpolation circuits produces the interpolating value based upon a signal of one sample clock or a plurality of sample clocks proceeding an inputted present signal value and the interpolating position information by linearly interpolating or interpolating with higher degree.

11. An information detecting circuit claimed in claim 8, wherein:

the interpolating position generating circuit includes;
  a phase comparator which converts an input information into a phase information,
  a low pass filter which is given with an output of the phase comparator, and
  a frequency converting circuit which generates the interpolating position information on the basis of a frequency information as output of the low pass filter.

12. An information detecting circuit claimed in claim 11, wherein:

the frequency converting circuit includes;
  means for producing an interpolating position signal of a sawtooth waveform having a slope corresponding to a deviation quantity of the frequency, and
  means for producing a timing control signal for halting an operation of the circuit in a portion where the interpolating position signal becomes discontinuous.

13. An information detecting circuit claimed in claim 8, wherein:
the rate correcting circuit produces a tap coefficient obtained by correcting the tap coefficient value produced from the tap coefficient controller with one or higher degree of a timing difference between the channel clock and the sampling clock.

14. An information detecting circuit claimed in claim 8, wherein:
the binary encoder comprises a Viterbi detector.

15. An information detecting circuit, comprising:
an A/D converter which samples a reproducing signal with a frequency higher than a channel clock of the reproducing signal;
a first equalizer which equalizes an output from the A/D converter as an A/D converting information;
a first interpolation circuit which generates an interpolating value from an output value series of the first equalizer;
a delay circuit which delays the A/D converting information with a delay quantity equivalent to an output delay quantity of the first equalizer and which produces the delayed information;
a second interpolation circuit which generates an interpolating value from an output value series of the delay circuit;
a second equalizer which equalizes the A/D converting information;
a third interpolation circuit which generates an interpolating value from an output value series of the second equalizer;
an interpolating position generating circuit which produces an interpolating position information for generating an interpolating value synchronized in phase with the channel clock of the reproducing signal from an output of the first interpolation circuit and which supplies the interpolating position information into the first interpolation circuit, the second interpolation circuit and the third interpolation circuit;
a selector which selects an output of the first interpolation circuit and an output of the third interpolation circuit in accordance with an inputted equalizing selection signal;
a tap coefficient controller which is variable in an equalizing system in accordance with the equalizing selection signal and which is given with an output of the selector and an output of the second interpolation circuit to produce a tap coefficient;
a rate correcting circuit which converts the tap coefficient produced from the tap coefficient controller for the first and second equalizers;
first and second resistors which select and control so as to produce or hold an output value from the rate correcting circuit in accordance with the equalizing selection signal; and
a binary encoder which converts the output to the third interpolation circuit and which produces a reproducing date series;
the tap coefficients produced from the first and second resistors being fed-back into the first and second equalizers, respectively.

16. An information detecting circuit claimed in claim 15, wherein:
the tap coefficient produced front the tap coefficient controller is directly supplied to the equalizer without passing the rate correcting circuit.

17. An information detecting circuit claimed in claim 15, wherein:
each of the first, second and third interpolation circuits produces the interpolating value based upon a signal of one sample clock or a plurality of sample clocks proceeding an inputted present signal value and the interpolating position information by linearly interpolating or interpolating with higher degree.

18. An information detecting circuit claimed in claim 15, wherein:
the interpolating position generating circuit includes;
a phase comparator which converts an input information into a phase information,
a low pass filter which is given with an output of the phase comparator, and
a frequency converting circuit which generates the interpolating position information on the basis of a frequency information as output of the low pass filter.

19. An information detecting circuit claimed in claim 18, wherein:
the frequency converting circuit includes;
means for producing an interpolating position signal of a sawtooth waveform having a slope corresponding to a deviation quantity of the frequency, and
means for producing a timing control signal for halting an operation of the circuit in a portion where the interpolating position signal becomes discontinuous.

20. An information detecting circuit claimed in claim 15, wherein:
the rate correcting circuit produces a tap coefficient obtained by correcting the tap coefficient value produced from the tap coefficient controller with one or higher degree of a timing difference between the channel clock and the sampling clock.

21. An information detecting circuit claimed in claim 15, wherein:
the binary encoder comprises a Viterbi detector.

22. An information detecting circuit, comprising:
an A/D converter which samples a reproducing signal with a predetermined sample rate;
an equalizer which equalizes an output from the A/D converter as an A/D converting information;
a first interpolation circuit which generates an interpolating value from an output value series of the equalizer;
a delay circuit which delays the A/D converting information with a delay quantity equivalent to an output delay quantity of the equalizer and which produces the delayed information;
a second interpolation circuit which generates an interpolating value from an output value series of the delay circuit;
an interpolating position generating circuit which produces an interpolating position information for generating an interpolating value synchronized in phase with the channel clock of the reproducing signal from an output of the first interpolation circuit and which supplies the interpolating position information into the first interpolation circuit and the second interpolation circuit;
a binary encoder which converts the output of the first interpolation circuit and which produces a reproducing data series;
a tap coefficient controller which generates a tap coefficient from an interpolating value output of the first interpolation circuit and an interpolating value output of the second interpolation circuit; and the tap coefficient produced from the tap coefficient controller being directly fed-back to the equalizer.

23. An information detecting circuit claimed in claim 22, wherein:

each of the first and second interpolation circuits produces the interpolating value based upon a signal of one sample clock or a plurality of sample clocks proceeding an inputted present signal value and the interpolating position information by linearly interpolating or interpolating with higher degree.

24. An information detecting circuit claimed in claim 22, wherein:

the interpolating position generating circuit includes;

a phase comparator which converts an input information into a phase information, a low pass filter which is given with an output of the phase comparator, and a frequency converting circuit which generates the interpolating position information on the basis of a frequency information as output of the low pass filter.

25. An information detecting circuit claimed in claim 24, wherein:

the frequency converting circuit includes;

means for producing an interpolating position signal of a sawtooth waveform having a slope corresponding to a deviation quantity of the frequency, and means for producing a timing control signal for halting an operation of the circuit in a portion where the interpolating position signal becomes discontinuous.

26. An information detecting circuit claimed in claim 22, wherein:

the rate correcting circuit produces a tap coefficient obtained by correcting the tap coefficient value produced from the tap coefficient controller with one or higher degree of a timing difference between the channel clock and the sampling clock.

27. An information detecting circuit claimed in claim 22, wherein:

the binary encoder comprises a Viterbi detector.

28. A reproducing apparatus, comprising:

an A/D converter which A/D-converts a reproducing signal with a sampling clock of a frequency higher than a channel clock and which produces the converted signal;

an equalizer which equalizes a digital output from the A/D converter with the same sampling clock as the A/D converter;

a first interpolation circuit which re-samples a digital equalizing output of the equalizer on the basis of the interpolating position signal and which produces an interpolating signal;

a correcting position generating circuit which includes a phase comparator given with an interpolating signal of the first interpolation circuit, a loop filter, and a frequency converting circuit so as to constitute a phase synchronizing loop and which produces an interpolating position signal synchronized in phase with a channel clock of the reproducing signal from the frequency converting circuit to supply into an input terminal of the interpolating position signal of the first interpolation circuit;

a second interpolation circuit which re-samples an output signal to the A/D converter delayed with a delay quantity corresponding to a signal delay quantity of the equalizer by a delay circuit and which produces the interpolating signal;

a tap coefficient controller which is given with an interpolating position signal from the interpolating position generating circuit as an interpolating position signal of the second interpolation circuit and which is given with an interpolating signal output of the first interpolation circuit and an interpolating signal output of the second interpolation circuit and which produces a tap coefficient;

a rate correcting circuit which converts the tap coefficient produced from the tap coefficient controller to supply into the equalizer; and a binary encoder converts the output of the first interpolation circuit and which produces a reproducing data.

29. A reproducing apparatus claimed in claim 28, including:

a reproducing system of an optical disk.

30. A reproducing apparatus claimed in claim 28, wherein:

a reproducing signal read-out from a disk recording medium via a head is given to the A/D converter.

* * * * *